United States Patent
Eisenfeld et al.

(10) Patent No.: US 11,543,583 B2
(45) Date of Patent: Jan. 3, 2023

(54) OPTICAL SYSTEMS INCLUDING LIGHT-GUIDE OPTICAL ELEMENTS WITH TWO-DIMENSIONAL EXPANSION

(71) Applicant: Lumus Ltd., Ness Ziona (IL)

(72) Inventors: Tsion Eisenfeld, Ashkelon (IL); Ronen Chriki, Lod (IL)

(73) Assignee: Lumus Ltd., Ness Ziona (IL)

( * ) Notice: Subject to any disclaimer, the term of this patent is extended or adjusted under 35 U.S.C. 154(b) by 35 days.

(21) Appl. No.: 17/268,970

(22) PCT Filed: Sep. 9, 2019

(86) PCT No.: PCT/IB2019/057572
§ 371 (c)(1),
(2) Date: Feb. 17, 2021

(87) PCT Pub. No.: WO2020/049542
PCT Pub. Date: Mar. 12, 2020

(65) Prior Publication Data
US 2021/0247608 A1 Aug. 12, 2021

Related U.S. Application Data

(60) Provisional application No. 62/728,803, filed on Sep. 9, 2018, provisional application No. 62/823,701, filed on Mar. 26, 2019.

(51) Int. Cl.
*G02B 27/01* (2006.01)
*F21V 8/00* (2006.01)
(52) U.S. Cl.
CPC ......... *G02B 6/0061* (2013.01); *G02B 6/0015* (2013.01); *G02B 6/0018* (2013.01);
(Continued)

(58) Field of Classification Search
CPC .. G02B 6/0015; G02B 6/0018; G02B 6/0035; G02B 6/0061; G02B 27/0101;
(Continued)

(56) References Cited

U.S. PATENT DOCUMENTS

| 2,748,659 A | 6/1956 | Geffcken et al. |
| 2,795,069 A | 6/1957 | Hardesty |

(Continued)

FOREIGN PATENT DOCUMENTS

| CN | 101542346 | 9/2009 |
| CN | 107238928 | 10/2017 |

(Continued)

OTHER PUBLICATIONS

Da-Yong et al., "A Continuous Membrane Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.

*Primary Examiner* — Daniel Petkovsek
(74) *Attorney, Agent, or Firm* — Mark M. Friedman

(57) ABSTRACT

An optical system including a light-guide optical element (LOE) with a first set of mutually-parallel, partially-reflecting surfaces and a second set of mutually-parallel, partially-reflecting surfaces at a different orientation from the first set. Both sets of partially-reflecting surfaces are located between a set of mutually-parallel major external surfaces. Image illumination introduced at a coupling-in location propagates along the LOE, is redirected by the first set of partially-reflecting surfaces towards the second set of partially-reflecting surfaces, where it is coupled out towards the eye of the user. The first set of partially-reflecting surfaces are implemented as partial surfaces located where needed for filling an eye-motion box with the required image. Additionally, or alternatively, spacing of the first set of partially-reflecting surfaces is varied across a first region of the LOE.

(Continued)

Additional features relate to relative orientations of the projector and partially reflecting surfaces to improve compactness and achieve various adjustments.

8 Claims, 19 Drawing Sheets

(52) U.S. Cl.
CPC ....... *G02B 6/0035* (2013.01); *G02B 27/0101* (2013.01); *G02B 27/0172* (2013.01); *G02B 2027/0118* (2013.01); *G02B 2027/0123* (2013.01); *G02B 2027/0178* (2013.01)

(58) Field of Classification Search
CPC ............ G02B 27/0118; G02B 27/0172; G02B 2027/0123; G02B 2027/0178
See application file for complete search history.

(56) References Cited

U.S. PATENT DOCUMENTS

| | | | |
|---|---|---|---|
| 2,886,911 | A | 5/1959 | Hardesty |
| 3,491,245 | A | 1/1970 | Hardesty |
| 3,626,394 | A | 12/1971 | Nelson et al. |
| 3,667,621 | A | 6/1972 | Barlow |
| 3,677,621 | A | 7/1972 | Smith |
| 3,737,212 | A | 6/1973 | Antonson et al. |
| 3,802,763 | A | 4/1974 | Cook et al. |
| 3,829,197 | A | 8/1974 | Thelen |
| 3,857,109 | A | 12/1974 | Pilloff |
| 3,873,209 | A | 3/1975 | Schinke et al. |
| 3,940,204 | A | 2/1976 | Withrington |
| 4,084,883 | A | 4/1978 | Eastman et al. |
| 4,191,446 | A | 3/1980 | Arditty et al. |
| 4,309,070 | A | 1/1982 | St Leger Searle |
| 4,331,387 | A | 5/1982 | Wentz |
| 4,516,828 | A | 5/1985 | Steele |
| 4,613,216 | A | 9/1986 | Herbec et al. |
| 4,711,512 | A | 12/1987 | Upatnieks |
| 4,715,684 | A | 12/1987 | Gagnon |
| 4,775,217 | A | 10/1988 | Ellis |
| 4,798,448 | A | 1/1989 | Van Raalte |
| 4,805,988 | A | 2/1989 | Dones |
| 4,932,743 | A | 6/1990 | Isobe et al. |
| 4,978,952 | A | 12/1990 | Irwin |
| 5,033,828 | A | 7/1991 | Haruta |
| 5,076,664 | A | 12/1991 | Migozzi |
| 5,096,520 | A | 3/1992 | Faris |
| 5,157,526 | A | 10/1992 | Kondo et al. |
| 5,231,642 | A | 7/1993 | Scifres et al. |
| 5,301,067 | A | 4/1994 | Bleier et al. |
| 5,353,134 | A | 10/1994 | Michel et al. |
| 5,367,399 | A | 11/1994 | Kramer |
| 5,369,415 | A | 11/1994 | Richard et al. |
| 5,453,877 | A | 9/1995 | Gerbe et al. |
| 5,543,877 | A | 8/1996 | Takashi et al. |
| 5,555,329 | A | 9/1996 | Kuper et al. |
| 5,619,601 | A | 4/1997 | Akashi et al. |
| 5,650,873 | A | 7/1997 | Gal et al. |
| 5,680,209 | A | 10/1997 | Maechler |
| 5,708,449 | A | 1/1998 | Heacock et al. |
| 5,724,163 | A | 3/1998 | David |
| 5,751,480 | A | 5/1998 | Kitagishi |
| 5,764,412 | A | 6/1998 | Suzuki et al. |
| 5,829,854 | A | 11/1998 | Jones |
| 5,883,684 | A | 3/1999 | Millikan et al. |
| 5,896,232 | A | 4/1999 | Budd et al. |
| 5,919,601 | A | 7/1999 | Nguyen et al. |
| 5,966,223 | A | 10/1999 | Yaakov et al. |
| 5,982,536 | A | 11/1999 | Swan |
| 6,021,239 | A | 2/2000 | Minami et al. |
| 6,023,372 | A | 2/2000 | Spitzer et al. |
| 6,052,500 | A | 4/2000 | Takano et al. |
| 6,091,548 | A | 7/2000 | Chen |
| 6,144,347 | A | 11/2000 | Mizoguchi et al. |
| 6,185,015 | B1 | 2/2001 | Silviu et al. |
| 6,222,676 | B1 | 4/2001 | Togino et al. |
| 6,322,256 | B1 | 11/2001 | Inada et al. |
| 6,324,330 | B1 | 11/2001 | Stites |
| 6,349,001 | B1 | 2/2002 | Spitzer |
| 6,362,861 | B1 | 3/2002 | Hertz et al. |
| 6,384,982 | B1 | 5/2002 | Spitzer |
| 6,388,814 | B2 | 5/2002 | Tanaka |
| 6,404,550 | B1 | 6/2002 | Yajima |
| 6,404,947 | B1 | 6/2002 | Matsuda |
| 6,490,104 | B1 | 12/2002 | Gleckman et al. |
| 6,509,982 | B2 | 1/2003 | Steiner |
| 6,519,400 | B2 | 2/2003 | Biscardi et al. |
| 6,542,307 | B2 | 4/2003 | Gleckman |
| 6,556,282 | B2 | 4/2003 | Jamieson et al. |
| 6,577,411 | B1 | 6/2003 | David |
| 6,580,529 | B1* | 6/2003 | Amitai ............... G02B 27/0944 359/13 |
| 6,671,100 | B1 | 12/2003 | McRuer |
| 6,690,513 | B2 | 2/2004 | Hulse et al. |
| 6,710,902 | B2 | 3/2004 | Takeyama |
| 6,762,801 | B2 | 7/2004 | Weiss et al. |
| 6,775,432 | B2 | 8/2004 | Basu |
| 6,791,760 | B2 | 9/2004 | Janeczko et al. |
| 6,798,579 | B2 | 9/2004 | Robinson et al. |
| 6,829,095 | B2 | 12/2004 | Amitai |
| 6,847,488 | B2 | 1/2005 | Travis |
| 6,880,931 | B2 | 4/2005 | Moliton et al. |
| 6,942,925 | B1 | 9/2005 | Lazarev et al. |
| 7,016,113 | B2 | 3/2006 | Choi et al. |
| 7,021,777 | B2 | 4/2006 | Amitai |
| 7,088,664 | B2 | 8/2006 | Kim et al. |
| 7,175,304 | B2 | 2/2007 | Wadia et al. |
| 7,205,960 | B2 | 4/2007 | David |
| 7,355,795 | B1 | 4/2008 | Yamazaki et al. |
| 7,391,573 | B2 | 6/2008 | Amitai |
| 7,418,170 | B2 | 8/2008 | Mukawa et al. |
| 7,430,355 | B2 | 9/2008 | Heikenfeld et al. |
| 7,448,170 | B2 | 11/2008 | Milovan et al. |
| 7,724,443 | B2 | 5/2010 | Amitai |
| 7,751,122 | B2 | 7/2010 | Amitai |
| 7,778,508 | B2 | 8/2010 | Hirayama |
| 7,839,575 | B2 | 11/2010 | DeJong et al. |
| 7,949,214 | B2 | 5/2011 | Dejong |
| 7,995,275 | B2 | 8/2011 | Maeda et al. |
| 8,035,872 | B2 | 10/2011 | Ouchi |
| 8,548,290 | B2* | 10/2013 | Travers ................ G02B 27/01 359/569 |
| 8,655,178 | B2 | 2/2014 | Capron et al. |
| 8,666,208 | B1 | 3/2014 | Amirparviz et al. |
| 8,736,963 | B2 | 5/2014 | Robbins et al. |
| 8,743,464 | B1 | 6/2014 | Amirparviz |
| 8,913,865 | B1 | 12/2014 | Bennett |
| 9,213,178 | B1 | 12/2015 | Giri et al. |
| 9,568,738 | B2 | 2/2017 | Mansharof et al. |
| 9,791,703 | B1* | 10/2017 | Vallius ................ G02B 5/1819 |
| 9,805,633 | B2 | 10/2017 | Zheng |
| 9,933,684 | B2 | 4/2018 | Brown et al. |
| 10,133,070 | B2* | 11/2018 | Danziger ........... G02B 27/0101 |
| 10,444,481 | B2 | 10/2019 | Takahashi |
| 10,678,055 | B2 | 6/2020 | Edwin et al. |
| 10,962,787 | B1* | 3/2021 | Lou ...................... G02B 6/0016 |
| 11,256,100 | B2 | 2/2022 | Schultz et al. |
| 2002/0015233 | A1 | 2/2002 | Park |
| 2002/0097762 | A1 | 7/2002 | Yoshimura et al. |
| 2002/0191297 | A1 | 12/2002 | Gleckman et al. |
| 2003/0007157 | A1 | 1/2003 | Hulse et al. |
| 2003/0020006 | A1 | 1/2003 | Janeczko et al. |
| 2003/0063042 | A1 | 4/2003 | Friesem et al. |
| 2003/0090439 | A1 | 5/2003 | Spitzer et al. |
| 2003/0165017 | A1 | 9/2003 | Amitai et al. |
| 2003/0197938 | A1 | 10/2003 | Schmidt et al. |
| 2003/0218718 | A1 | 11/2003 | Moliton et al. |
| 2004/0032660 | A1 | 2/2004 | Amitai |
| 2004/0033528 | A1 | 2/2004 | Amitai |
| 2004/0085649 | A1 | 5/2004 | Repetto et al. |
| 2004/0137189 | A1 | 7/2004 | Tellini et al. |
| 2004/0176488 | A1 | 9/2004 | Mukherjee et al. |

(56) References Cited

U.S. PATENT DOCUMENTS

| | | |
|---|---|---|
| 2004/0233534 A1 | 11/2004 | Nakanishi et al. |
| 2005/0012842 A1 | 1/2005 | Miyagawa et al. |
| 2005/0018308 A1 | 1/2005 | Cassarly et al. |
| 2005/0078388 A1 | 4/2005 | Amitai |
| 2005/0083592 A1 | 4/2005 | Amitai |
| 2005/0084210 A1 | 4/2005 | Cha |
| 2005/0174641 A1 | 8/2005 | Greenberg |
| 2005/0174658 A1 | 8/2005 | Long et al. |
| 2005/0180687 A1 | 8/2005 | Amitai |
| 2005/0265044 A1 | 12/2005 | Chen et al. |
| 2006/0126182 A1 | 6/2006 | Levola |
| 2006/0132914 A1 | 6/2006 | Weiss et al. |
| 2006/0268421 A1 | 11/2006 | Shimizu et al. |
| 2007/0035707 A1 | 2/2007 | Margulis |
| 2007/0070859 A1 | 3/2007 | Hirayama |
| 2007/0091445 A1 | 4/2007 | Amitai |
| 2007/0097513 A1 | 5/2007 | Amitai |
| 2007/0155277 A1 | 7/2007 | Amitai |
| 2008/0025667 A1 | 1/2008 | Amitai |
| 2008/0094586 A1 | 4/2008 | Hirayama |
| 2008/0106775 A1 | 5/2008 | Amitai |
| 2008/0151379 A1 | 6/2008 | Amitai |
| 2008/0186604 A1 | 8/2008 | Amitai |
| 2008/0198471 A1 | 8/2008 | Amitai |
| 2008/0259429 A1 | 10/2008 | Kamm et al. |
| 2008/0278812 A1 | 11/2008 | Amitai |
| 2008/0285140 A1 | 11/2008 | Amitai |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1* | 5/2009 | Amitai ............... G02B 27/0172 359/629 |
| 2009/0153437 A1 | 6/2009 | Aharoni |
| 2009/0190222 A1 | 7/2009 | Simmonds et al. |
| 2010/0171680 A1 | 7/2010 | Lapidot et al. |
| 2010/0202128 A1 | 8/2010 | Saccomanno |
| 2010/0278480 A1 | 11/2010 | Vasylyev et al. |
| 2010/0291489 A1 | 11/2010 | Moskovits et al. |
| 2012/0039576 A1 | 2/2012 | Dangel et al. |
| 2012/0147361 A1 | 6/2012 | Mochizuki et al. |
| 2012/0179369 A1 | 6/2012 | Lapidot et al. |
| 2013/0229717 A1 | 9/2013 | Amitai |
| 2013/0276960 A1 | 10/2013 | Amitai |
| 2013/0279017 A1 | 10/2013 | Amitai |
| 2013/0321432 A1 | 12/2013 | Burns et al. |
| 2013/0334504 A1 | 12/2013 | Thompson et al. |
| 2014/0003762 A1 | 1/2014 | Macnamara |
| 2014/0043688 A1 | 2/2014 | Schrader et al. |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0185142 A1 | 7/2014 | Gupta et al. |
| 2014/0226215 A1 | 8/2014 | Komatsu et al. |
| 2015/0016777 A1 | 1/2015 | Abovitz et al. |
| 2015/0081313 A1 | 3/2015 | Boross et al. |
| 2015/0138451 A1 | 5/2015 | Amitai |
| 2015/0138646 A1 | 5/2015 | Tatsugi |
| 2015/0160529 A1 | 6/2015 | Popovich et al. |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0219834 A1 | 8/2015 | Nichol et al. |
| 2015/0277127 A1 | 10/2015 | Amitai |
| 2015/0338655 A1 | 11/2015 | Sawada et al. |
| 2015/0293360 A1 | 12/2015 | Amitai |
| 2016/0116743 A1 | 4/2016 | Amitai |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0234485 A1 | 8/2016 | Robbins et al. |
| 2016/0022388 A1 | 9/2016 | Dobschal et al. |
| 2016/0341964 A1 | 11/2016 | Amitai |
| 2016/0349518 A1 | 12/2016 | Amitai et al. |
| 2017/0045743 A1 | 2/2017 | Dobschal et al. |
| 2017/0045744 A1 | 2/2017 | Amitai |
| 2017/0052376 A1 | 2/2017 | Amitai |
| 2017/0052377 A1 | 2/2017 | Amitai |
| 2017/0075119 A1 | 3/2017 | Schultz et al. |
| 2017/0242249 A1 | 8/2017 | Wall |
| 2017/0336636 A1 | 11/2017 | Amitai et al. |
| 2017/0343822 A1 | 11/2017 | Border et al. |
| 2017/0357095 A1 | 12/2017 | Amitai |
| 2017/0363799 A1 | 12/2017 | Ofir et al. |
| 2017/0371160 A1 | 12/2017 | Schultz |
| 2018/0039082 A1 | 2/2018 | Amitai |
| 2018/0067315 A1 | 3/2018 | Amitai et al. |
| 2018/0157057 A1 | 6/2018 | Gelberg et al. |
| 2018/0210202 A1 | 7/2018 | Danziger |
| 2018/0246335 A1 | 8/2018 | Cheng et al. |
| 2018/0267295 A1 | 9/2018 | Dalrymple et al. |
| 2018/0267317 A1 | 9/2018 | Amitai |
| 2018/0275384 A1 | 9/2018 | Danziger et al. |
| 2018/0284443 A1 | 10/2018 | Matsuki et al. |
| 2018/0284448 A1* | 10/2018 | Matsuki ............... G02B 6/0055 |
| 2018/0292592 A1 | 10/2018 | Danziger |
| 2018/0292599 A1 | 10/2018 | Ofir et al. |
| 2018/0373039 A1 | 12/2018 | Amitai |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0187482 A1 | 6/2019 | Lanman |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0278086 A1 | 9/2019 | Ofir |
| 2019/0285900 A1 | 9/2019 | Amitai |
| 2019/0293838 A1* | 9/2019 | Haba ..................... G02B 1/10 |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0200963 A1 | 6/2020 | Eisenfeld et al. |
| 2020/0209667 A1 | 7/2020 | Sharlin et al. |
| 2020/0241308 A1 | 7/2020 | Danziger et al. |
| 2020/0249481 A1 | 8/2020 | Danziger et al. |
| 2020/0278554 A1 | 9/2020 | Schultz et al. |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |

(56) References Cited

U.S. PATENT DOCUMENTS

| | | |
|---|---|---|
| 2021/0099691 A1 | 4/2021 | Danziger |
| 2021/0109351 A1 | 4/2021 | Danziger et al. |
| 2021/0116367 A1 | 4/2021 | Gelberg et al. |
| 2021/0141141 A1 | 5/2021 | Danziger et al. |
| 2021/0157150 A1 | 5/2021 | Amitai |
| 2021/0165231 A1 | 6/2021 | Gelberg et al. |
| 2021/0239898 A1 | 8/2021 | Danziger et al. |
| 2021/0247608 A1 | 8/2021 | Eisenfeld et al. |
| 2021/0271006 A1 | 9/2021 | Ronen et al. |
| 2022/0003914 A1 | 1/2022 | Danziger et al. |
| 2022/0004001 A1 | 1/2022 | Danziger et al. |
| 2022/0004014 A1 | 1/2022 | Ronen et al. |
| 2022/0019018 A1 | 1/2022 | Gilo et al. |
| 2022/0030205 A1 | 1/2022 | Danziger |
| 2022/0043269 A1 | 2/2022 | Maziel |
| 2022/0043272 A1 | 2/2022 | Amitai |
| 2022/0057643 A1 | 2/2022 | Eisenfeld et al. |
| 2022/0075194 A1 | 3/2022 | Ronen et al. |

FOREIGN PATENT DOCUMENTS

| | | |
|---|---|---|
| CN | 206649211 U | 11/2017 |
| DE | 1422172 | 11/1970 |
| DE | 19725262 | 12/1998 |
| DE | 102013106392 | 12/2014 |
| EP | 0380035 | 8/1990 |
| EP | 0399865 | 11/1990 |
| EP | 0543718 | 5/1993 |
| EP | 0566004 | 10/1993 |
| EP | 1180711 | 2/2002 |
| EP | 1326102 | 7/2003 |
| EP | 1385023 | 1/2004 |
| EP | 0770818 | 4/2007 |
| EP | 2530510 | 12/2012 |
| FR | 2496905 | 6/1982 |
| FR | 2638242 | 4/1990 |
| FR | 2721872 | 1/1996 |
| GB | 2220081 | 12/1989 |
| GB | 2272980 | 6/1994 |
| GB | 2278222 | 11/1994 |
| GB | 2278888 | 12/1994 |
| JP | H02182447 | 7/1990 |
| JP | 2002539498 | 11/2002 |
| JP | 2003140081 | 5/2003 |
| JP | 2004527801 | 9/2004 |
| JP | 2005084522 | 3/2005 |
| JP | 2008053517 | 3/2008 |
| JP | 2016033867 | 3/2016 |
| JP | 2012058404 | 3/2021 |
| WO | 0004407 | 1/2000 |
| WO | 0063738 | 10/2000 |
| WO | 0195025 | 12/2001 |
| WO | 2005093493 | 10/2005 |
| WO | 2006098097 | 9/2006 |
| WO | 2007054928 | 5/2007 |
| WO | 2009074638 | 6/2009 |
| WO | 2011130720 | 10/2011 |
| WO | 2013065656 | 5/2013 |
| WO | 2015081313 | 6/2015 |
| WO | 2017106873 | 6/2017 |
| WO | 2021-055278 | 3/2021 |

\* cited by examiner

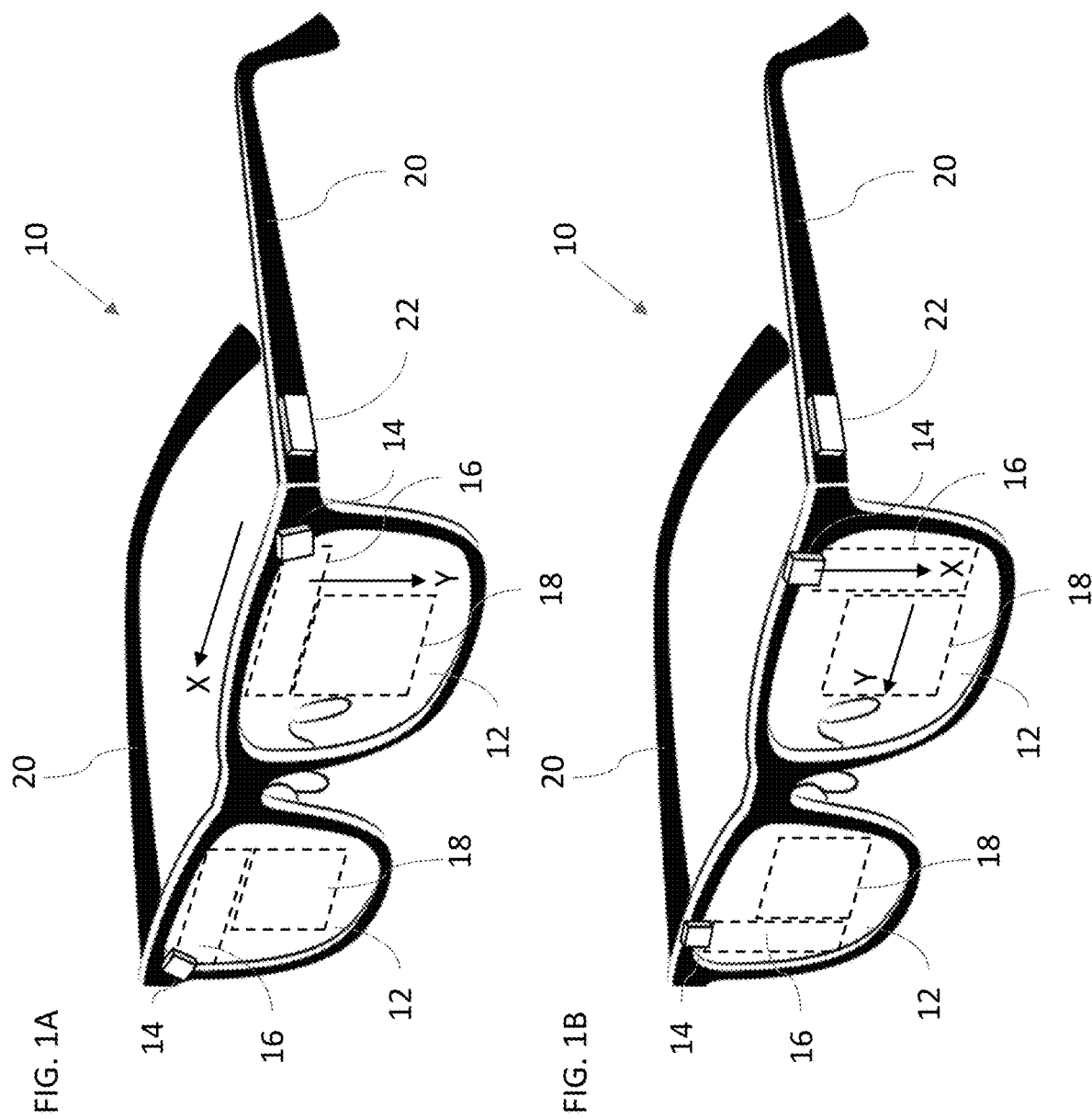

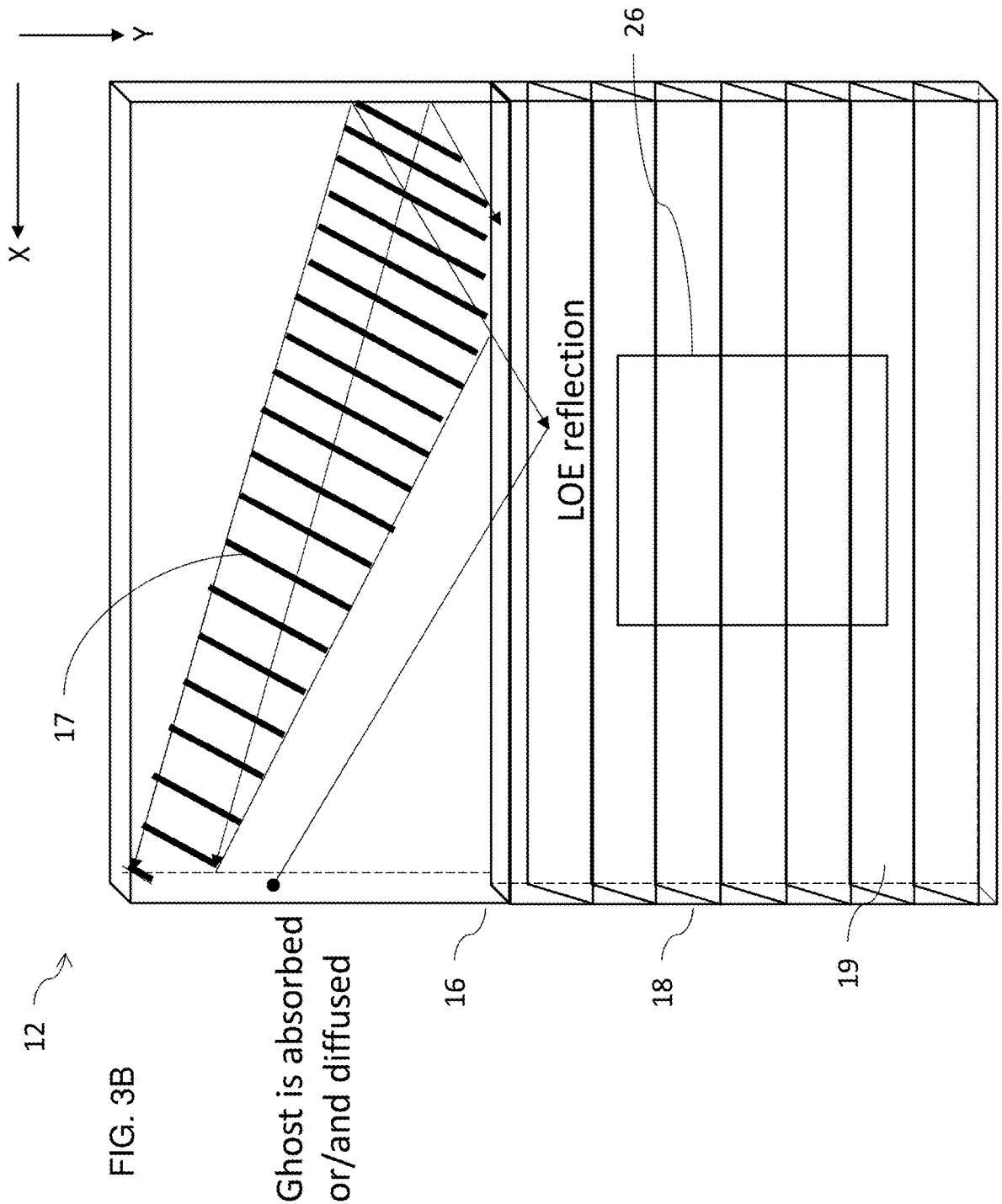

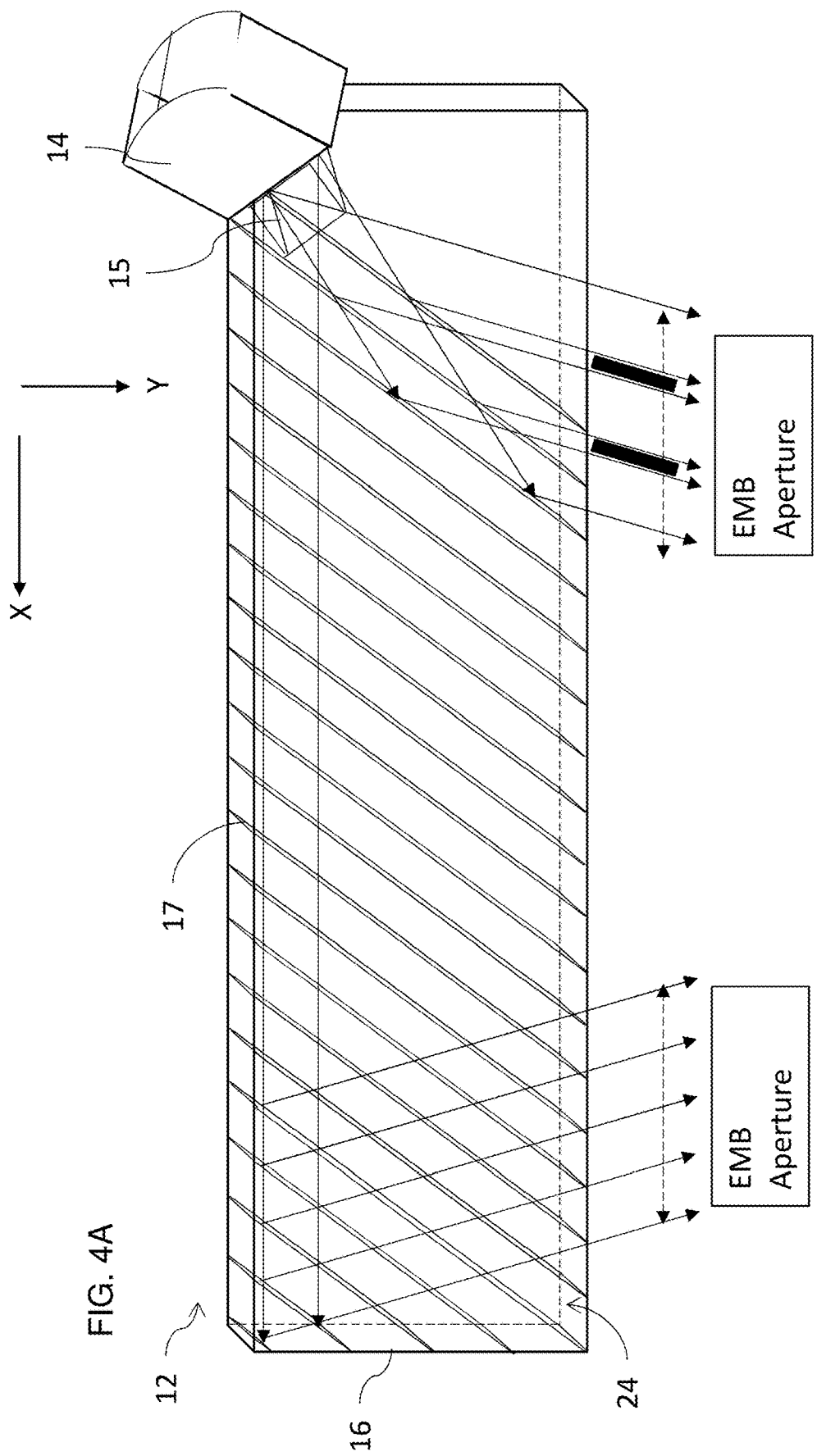

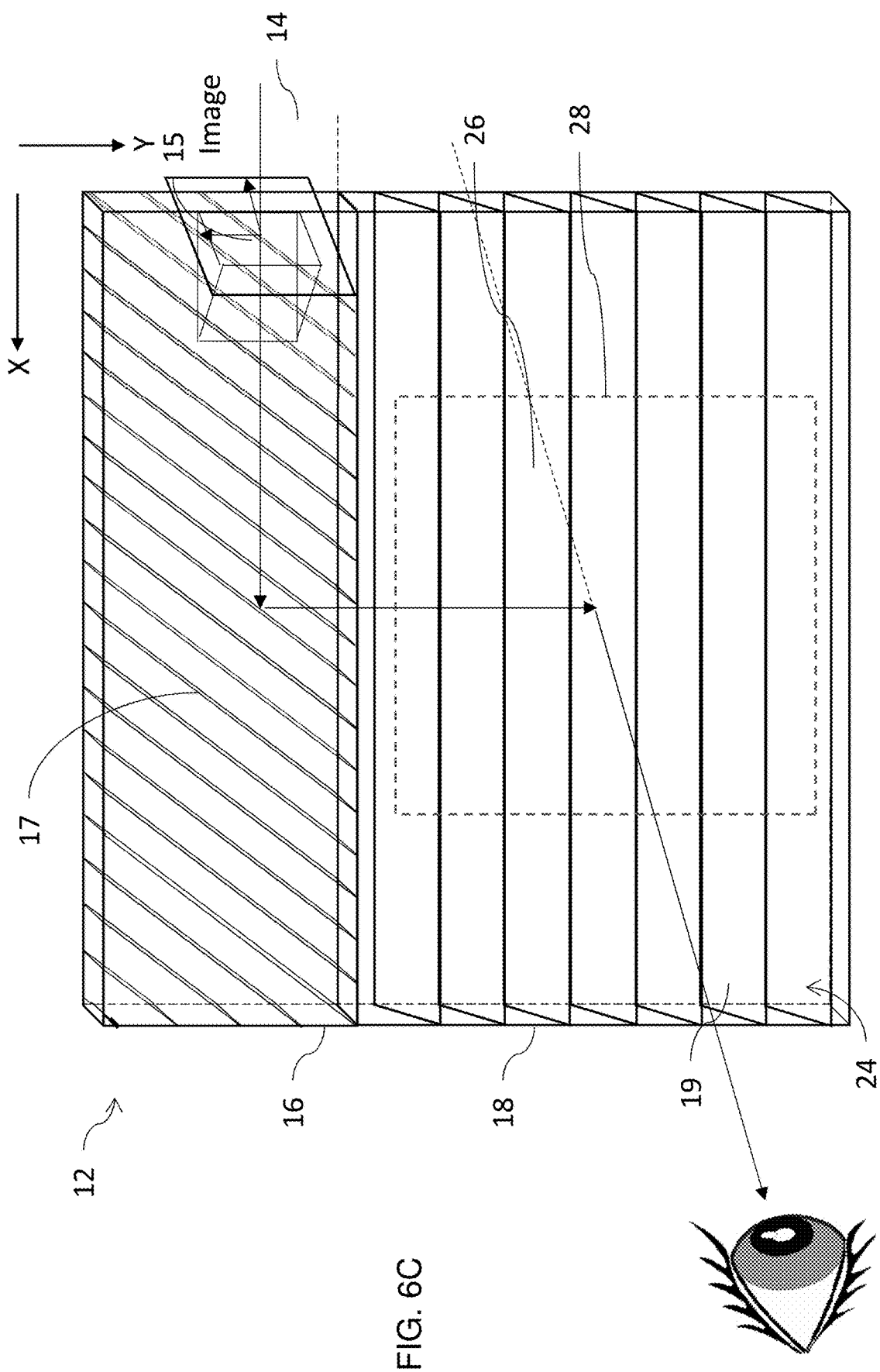
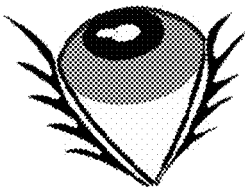
FIG. 6C

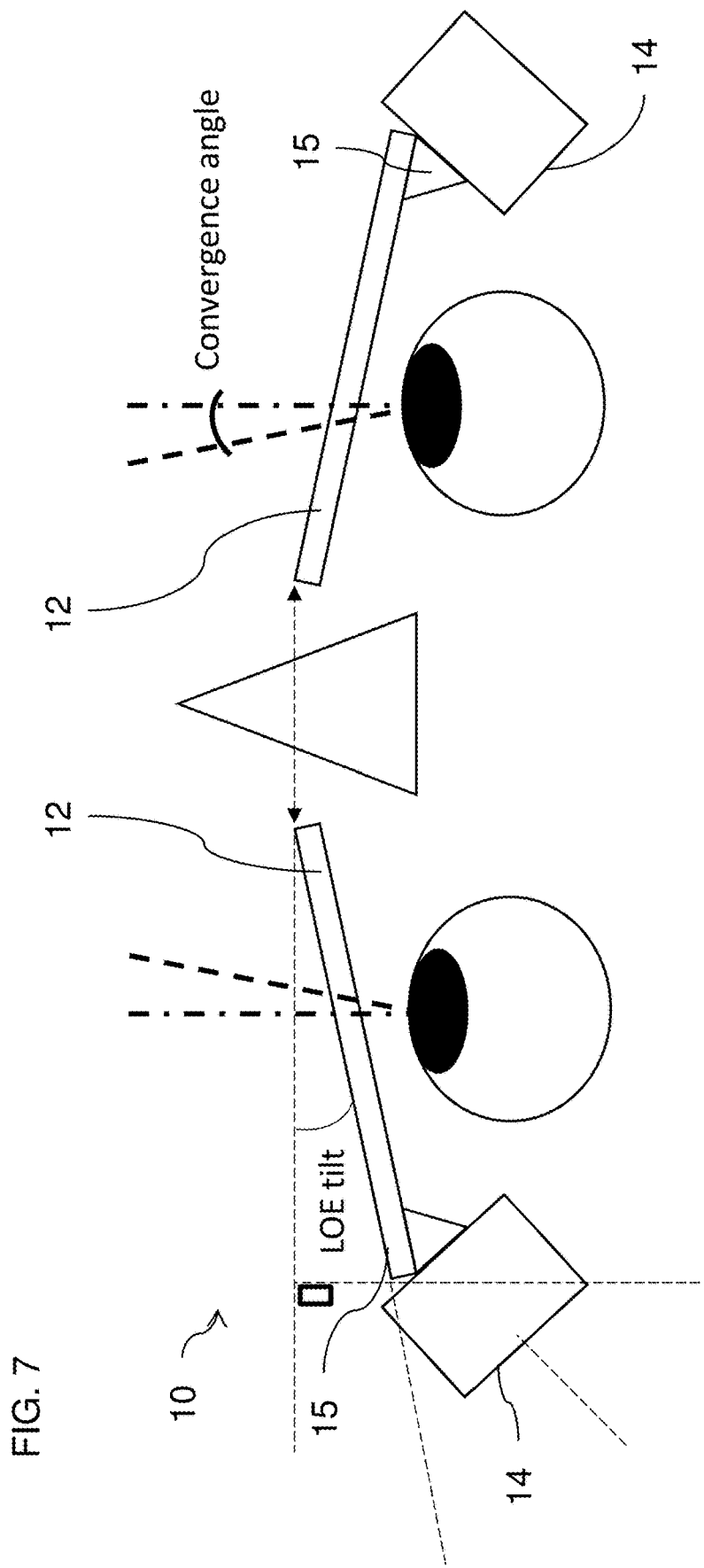

OPTICAL SYSTEMS INCLUDING LIGHT-GUIDE OPTICAL ELEMENTS WITH TWO-DIMENSIONAL EXPANSION

FIELD AND BACKGROUND OF THE INVENTION

The present invention relates to optical systems and, in particular, it concerns an optical system including a light-guide optical element (LOE) for achieving optical aperture expansion.

Many near-eye display systems include a transparent light-guide optical element (LOE) or "waveguide" placed before the eye of the user, which conveys an image within the LOE by internal reflection and then couples out the image by a suitable output coupling mechanism towards the eye of the user. The output coupling mechanism may be based on embedded partial reflectors or "facets", or may employ a diffractive pattern. The description below will refer primarily to a facet-based coupling-out arrangement, but it should be appreciated that various features of the invention are also applicable to diffractive arrangements.

SUMMARY OF THE INVENTION

The present invention is an optical system.

According to the teachings of an embodiment of the present invention there is provided, an optical system for directing image illumination injected at a coupling-in region to an eye-motion box for viewing by an eye of a user, the optical system comprising a light-guide optical element (LOE) formed from transparent material, the LOE comprising: (a) a first region containing a first set of planar, mutually-parallel, partially-reflecting surfaces having a first orientation; (b) a second region containing a second set of planar, mutually-parallel, partially-reflecting surfaces having a second orientation non-parallel to the first orientation; (c) a set of mutually-parallel major external surfaces, the major external surfaces extending across the first and second regions such that both the first set of partially-reflecting surfaces and the second set of partially-reflecting surfaces are located between the major external surfaces, wherein the second set of partially-reflecting surfaces are at an oblique angle to the major external surfaces so that a part of image illumination propagating within the LOE by internal reflection at the major external surfaces from the first region into the second region is coupled out of the LOE towards the eye-motion box, and wherein the first set of partially-reflecting surfaces are oriented so that a part of image illumination propagating within the LOE by internal reflection at the major external surfaces from the coupling-in region is deflected towards the second region, wherein each of the partially-reflecting surfaces of the first set of partially-reflecting surfaces comprises a partially-reflecting coating at an interface plane between two plates forming part of the LOE, and wherein the partially-reflecting coating is located over a first part of the interface plane, and at least one of the partially-reflecting surfaces has a second part of the interface plane bonded so as to form an optical continuum between the two plates.

According to a further feature of an embodiment of the present invention, an envelope of ray paths from the coupling-in region propagating within the LOE, deflected by one of the first set of partially-reflecting surfaces and coupled out by one of the second set of partially-reflecting surfaces in a direction reaching the eye-motion box defines an imaging area of the one of the first set of partially-reflecting surfaces, and wherein an area of the one of the first set of partially-reflecting surfaces lying outside the envelope defines a non-imaging area of the one of the first set of partially-reflecting surfaces, wherein a majority of the non-imaging area is bonded so as to form an optical continuum between the two plates.

According to a further feature of an embodiment of the present invention, the first set of partially-reflecting surfaces have a non-uniform spacing such that a spacing between adjacent partially-reflecting surfaces proximal to the coupling-in region is smaller than a spacing between adjacent partially-reflecting surfaces further from the coupling-in region.

According to a further feature of an embodiment of the present invention, the optical system further comprising an image projector for projecting a collimated image having an angular field of view about an optical axis, the image projector being optically coupled to the LOE so as to introduce the collimated image into the LOE at the coupling-in region as a propagating image propagating within the LOE by internal reflection at the major external surfaces, the propagating image being partially reflected by the first set of partially-reflecting surfaces to generate a deflected propagating image propagating within the LOE by internal reflection at the major external surfaces, the deflected propagating image being partially reflected by the second set of partially-reflecting surfaces to generate a coupled-out image directed outwards from one of the major external surfaces towards the eye-motion box, the optical axis of the coupled-out image being inclined relative to a normal to the major external surface with a non-zero component of inclination along an in-plane extensional direction of the second set of partially-reflecting surfaces.

According to a further feature of an embodiment of the present invention, configured for projecting the image to the eye-motion box with principal axes including an X axis corresponding to a first horizontal or vertical axis of the projected image, and a Y axis corresponding to the other axis of the projected image, and wherein the second set of partially-reflecting surfaces have an extensional direction parallel to the major external surfaces, the extensional direction having an angular offset relative to X axis.

According to a further feature of an embodiment of the present invention, configured for projecting the image to the eye-motion box with principal axes including an X axis corresponding to a first horizontal or vertical axis of the projected image, and a Y axis corresponding to the other axis of the projected image, the optical system further comprising an image projector for projecting a collimated image having an angular field of view about an optical axis, the image projector being optically coupled to the LOE so as to introduce the collimated image into the LOE at the coupling-in region as a propagating image propagating within the LOE by internal reflection at the major external surfaces, an in-plane component of the optical axis of the propagating image being inclined relative to the X axis towards a boundary of the second region.

According to a further feature of an embodiment of the present invention, an in-plane component of one extremity of the field of view of the propagating image is substantially parallel to the X axis.

According to a further feature of an embodiment of the present invention, configured for projecting the image to the eye-motion box with principal axes including an X axis corresponding to a first horizontal or vertical axis of the projected image, and a Y axis corresponding to the other axis of the projected image, the optical system further comprising an image projector for projecting a collimated image having an angular field of view about an optical axis, the image projector being optically coupled to the LOE so as to introduce the collimated image into the LOE at the coupling-in region as a propagating image propagating within the LOE by internal reflection at the major external surfaces, the propagating image being partially reflected by the first set of partially-reflecting surfaces to generate a deflected propagating image propagating within the LOE by internal reflection at the major external surfaces, an in-plane component of the optical axis of the deflected propagating image being inclined relative to the Y axis.

There is also provided according to the teachings of an embodiment of the present invention, an optical system for projecting an image injected at a coupling-in region for viewing at an eye-motion box by an eye of a user, the image being viewed with principal axes including an X axis corresponding to a horizontal or vertical axis of the projected image, and a Y axis corresponding to an axis of the projected image perpendicular to the X axis, the optical system comprising a light-guide optical element (LOE) formed from transparent material, the LOE comprising: (a) a first region containing a first set of planar, mutually-parallel, partially-reflecting surfaces having a first orientation; (b) a second region containing a second set of planar, mutually-parallel, partially-reflecting surfaces having a second orientation non-parallel to the first orientation; (c) a set of mutually-parallel major external surfaces, the major external surfaces extending across the first and second regions such that both the first set of partially-reflecting surfaces and the second set of partially-reflecting surfaces are located between the major external surfaces, wherein the second set of partially-reflecting surfaces are at an oblique angle to the major external surfaces so that a part of image illumination propagating within the LOE by internal reflection at the major external surfaces from the first region into the second region is coupled out of the LOE towards the eye-motion box, and wherein the first set of partially-reflecting surfaces are oriented so that a part of image illumination propagating within the LOE by internal reflection at the major external surfaces from the coupling-in region is deflected towards the second region, and wherein the second set of partially-reflecting surfaces have an extensional direction parallel to the major external surfaces, the extensional direction having an angular offset relative to X axis.

There is also provided according to the teachings of an embodiment of the present invention, an optical system for projecting an image injected at a coupling-in region for viewing at an eye-motion box by an eye of a user, the image being viewed with principal axes including an X axis corresponding to a horizontal or vertical axis of the projected image, and a Y axis corresponding to an axis of the projected image perpendicular to the X axis, the optical system comprising a light-guide optical element (LOE) formed from transparent material, the LOE comprising: (a) a first region containing a first set of planar, mutually-parallel, partially-reflecting surfaces having a first orientation; (b) a second region containing a second set of planar, mutually-parallel, partially-reflecting surfaces having a second orientation non-parallel to the first orientation; (c) a set of mutually-parallel major external surfaces, the major external surfaces extending across the first and second regions such that both the first set of partially-reflecting surfaces and the second set of partially-reflecting surfaces are located between the major external surfaces, wherein the second set of partially-reflecting surfaces are at an oblique angle to the major external surfaces so that a part of image illumination propagating within the LOE by internal reflection at the major external surfaces from the first region into the second region is coupled out of the LOE towards the eye-motion box, and wherein the first set of partially-reflecting surfaces are oriented so that a part of image illumination propagating within the LOE by internal reflection at the major external surfaces from the coupling-in region is deflected towards the second region, the optical system further comprising an image projector for projecting a collimated image having an angular field of view about an optical axis, the image projector being optically coupled to the LOE so as to introduce the collimated image into the LOE at the coupling-in region as a propagating image propagating within the LOE by internal reflection at the major external surfaces, an in-plane component of the optical axis of the propagating image being inclined relative to the X axis towards a boundary of the second region.

According to a further feature of an embodiment of the present invention, an in-plane component of one extremity of the field of view of the propagating image is substantially parallel to the X axis.

There is also provided according to the teachings of an embodiment of the present invention, an optical system for projecting an image injected at a coupling-in region for viewing at an eye-motion box by an eye of a user, the image being viewed with principal axes including an X axis corresponding to a horizontal or vertical axis of the projected image, and a Y axis corresponding to an axis of the projected image perpendicular to the X axis, the optical system comprising a light-guide optical element (LOE) formed from transparent material, the LOE comprising: (a) a first region containing a first set of planar, mutually-parallel, partially-reflecting surfaces having a first orientation; (b) a second region containing a second set of planar, mutually-parallel, partially-reflecting surfaces having a second orientation non-parallel to the first orientation; (c) a set of mutually-parallel major external surfaces, the major external surfaces extending across the first and second regions such that both the first set of partially-reflecting surfaces and the second set of partially-reflecting surfaces are located between the major external surfaces, wherein the second set of partially-reflecting surfaces are at an oblique angle to the major external surfaces so that a part of image illumination propagating within the LOE by internal reflection at the major external surfaces from the first region into the second region is coupled out of the LOE towards the eye-motion box, and wherein the first set of partially-reflecting surfaces are oriented so that a part of image illumination propagating within the LOE by internal reflection at the major external surfaces from the coupling-in region is deflected towards the second region, the optical system further comprising an image projector for projecting a collimated image having an angular field of view about an optical axis, the image projector being optically coupled to the LOE so as to introduce the collimated image into the LOE at the coupling-in region as a propagating image propagating within the LOE by internal reflection at the major external surfaces, the propagating image being partially reflected by the first set of partially-reflecting surfaces to generate a deflected propagating image propagating within the LOE by internal reflection at the major external surfaces, an in-plane component of the optical axis of the deflected propagating image being inclined relative to the Y axis.

According to a further feature of an embodiment of the present invention, the eye-motion box is delimited by at least one straight line parallel to the X axis.

According to a further feature of an embodiment of the present invention, the projected image is a rectangular image having edges parallel to the X axis and the Y axis.

According to a further feature of an embodiment of the present invention, there is also provided a support arrangement configured for supporting the LOE relative to the head of the user with one of the major external surfaces in facing relation to the eye of the user and in an orientation relative to the eye of the user such that the X axis is oriented horizontally.

According to a further feature of an embodiment of the present invention, the first region and the second region are separated by a boundary that extends parallel to the X axis.

There is also provided according to the teachings of an embodiment of the present invention, an optical system for directing image illumination injected at a coupling-in region to an eye-motion box for viewing by an eye of a user, the optical system comprising a light-guide optical element (LOE) formed from transparent material, the LOE comprising: (a) a first region containing a first set of planar, mutually-parallel, partially-reflecting surfaces having a first orientation; (b) a second region containing a second set of planar, mutually-parallel, partially-reflecting surfaces having a second orientation non-parallel to the first orientation; (c) a set of mutually-parallel major external surfaces, the major external surfaces extending across the first and second regions such that both the first set of partially-reflecting surfaces and the second set of partially-reflecting surfaces are located between the major external surfaces, wherein the second set of partially-reflecting surfaces are at an oblique angle to the major external surfaces so that a part of image illumination propagating within the LOE by internal reflection at the major external surfaces from the first region into the second region is coupled out of the LOE towards the eye-motion box, and wherein the first set of partially-reflecting surfaces are oriented so that a part of image illumination propagating within the LOE by internal reflection at the major external surfaces from the coupling-in region is deflected towards the second region, and wherein the first set of partially-reflecting surfaces have a non-uniform spacing such that a spacing between adjacent partially-reflecting surfaces proximal to the coupling-in region is smaller than a spacing between adjacent partially-reflecting surfaces further from the coupling-in region.

There is also provided according to the teachings of an embodiment of the present invention, an optical system for directing image illumination injected at a coupling-in region to an eye-motion box for viewing by an eye of a user, the optical system comprising a light-guide optical element (LOE) formed from transparent material, the LOE comprising: (a) a first region containing a first set of planar, mutually-parallel, partially-reflecting surfaces having a first orientation; (b) a second region containing a second set of planar, mutually-parallel, partially-reflecting surfaces having a second orientation non-parallel to the first orientation; (c) a set of mutually-parallel major external surfaces, the major external surfaces extending across the first and second regions such that both the first set of partially-reflecting surfaces and the second set of partially-reflecting surfaces are located between the major external surfaces, wherein the second set of partially-reflecting surfaces are at an oblique angle to the major external surfaces so that a part of image illumination propagating within the LOE by internal reflection at the major external surfaces from the first region into the second region is coupled out of the LOE towards the eye-motion box, and wherein the first set of partially-reflecting surfaces are oriented so that a part of image illumination propagating within the LOE by internal reflection at the major external surfaces from the coupling-in region is deflected towards the second region, the optical system further comprising an image projector for projecting a collimated image having an angular field of view about an optical axis, the image projector being optically coupled to the LOE so as to introduce the collimated image into the LOE at the coupling-in region as a propagating image propagating within the LOE by internal reflection at the major external surfaces, the propagating image being partially reflected by the first set of partially-reflecting surfaces to generate a deflected propagating image propagating within the LOE by internal reflection at the major external surfaces, the deflected propagating image being partially reflected by the second set of partially-reflecting surfaces to generate a coupled-out image directed outwards from one of the major external surfaces towards the eye-motion box, the optical axis of the coupled-out image being inclined relative to a normal to the major external surface with a non-zero component of inclination along an in-plane extensional direction of the second set of partially-reflecting surfaces.

BRIEF DESCRIPTION OF THE DRAWINGS

The invention is herein described, by way of example only, with reference to the accompanying drawings, wherein:

FIGS. 1A and 1B are schematic isometric views of an optical system implemented using a light-guide optical element (LOE), constructed and operative according to the teachings of the present invention, illustrating a top-down and a side-injection configuration, respectively;

FIGS. 3A and 3B are views similar to FIG. 2E illustrating a potential ray path for ghost formation with and without the presence of a partially-reflecting surface outside the required profile of partially-reflecting surfaces;

FIG. 4A is an enlarged schematic isometric view of a first region of an LOE from a further implementation of an LOE from FIG. 1A or 1B showing ray paths for two extreme fields;

FIGS. 6A-6D are schematic isometric views similar to FIG. 2A-2F illustrating the effects of various angular offset parameters; and FIG. 7 is a schematic top view of a near-eye display illustrating angular offsets required for face-curve and convergence corrections according to an aspect of the present invention.

DESCRIPTION OF THE PREFERRED EMBODIMENTS

Figure 2A:
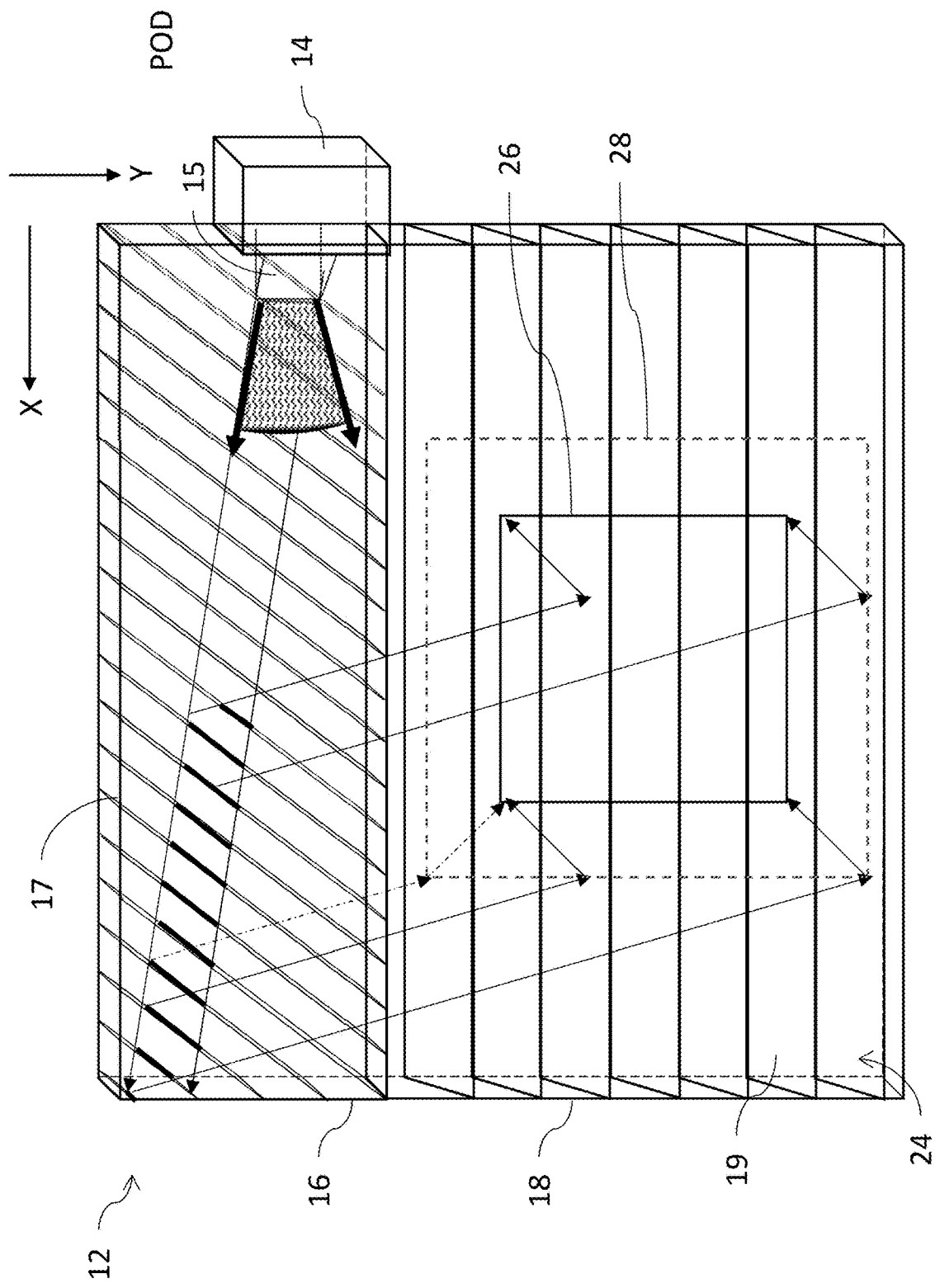
FIGS. 2A and 2B are enlarged schematic isometric views of an LOE from FIG. 1A or 1B showing ray paths for two extreme fields of an image.

Certain embodiments of the present invention provide an optical system including a light-guide optical element (LOE) for achieving optical aperture expansion for the purpose of a head-up display, and most preferably a near-eye display, which may be a virtual reality display, or more preferably an augmented reality display.

An exemplary implementation of a device in the form of a near-eye display, generally designated 10, employing an LOE 12 according to the teachings of an embodiment of the present invention, is illustrated schematically in FIGS. 1A and 1B. The near-eye display 10 employs a compact image projector (or "POD") 14 optically coupled so as to inject an image into LOE (interchangeably referred to as a "waveguide," a "substrate" or a "slab") 12 within which the image light is trapped in one dimension by internal reflection at a set of mutually-parallel planar external surfaces. The light impinges of a set of partially-reflecting surfaces (interchangeably referred to as "facets") that are parallel to each other, and inclined obliquely to the direction of propagation of the image light, with each successive facet deflecting a proportion of the image light into a deflected direction, also trapped/guided by internal reflection within the substrate. This first set of facets are not illustrated individually in FIGS. 1A and 1B, but are located in a first region of the LOE designated 16. This partial reflection at successive facets achieves a first dimension of optical aperture expansion.

In a first set of preferred but non-limiting examples of the present invention, the aforementioned set of facets are orthogonal to the major external surfaces of the substrate. In this case, both the injected image and its conjugate undergoing internal reflection as it propagates within region 16 are deflected and become conjugate images propagating in a deflected direction. In an alternative set of preferred but non-limiting examples, the first set of partially-reflecting surfaces are obliquely angled relative to the major external surfaces of the LOE. In the latter case, either the injected image or its conjugate forms the desired deflected image propagating within the LOE, while the other reflection may be minimized, for example, by employing angularly-selective coatings on the facets which render them relatively transparent to the range of incident angles presented by the image whose reflection is not needed.

The first set of partially-reflecting surfaces deflect the image illumination from a first direction of propagation trapped by total internal reflection (TIR) within the substrate to a second direction of propagation, also trapped by TIR within the substrate.

The deflected image illumination then passes into a second substrate region 18, which may be implemented as an adjacent distinct substrate or as a continuation of a single substrate, in which a coupling-out arrangement (either a further set of partially reflective facets or a diffractive optical element) progressively couples out a proportion of the image illumination towards the eye of an observer located within a region defined as the eye-motion box (EMB), thereby achieving a second dimension of optical aperture expansion. The overall device may be implemented separately for each eye, and is preferably supported relative to the head of a user with the each LOE 12 facing a corresponding eye of the user. In one particularly preferred option as illustrated here, a support arrangement is implemented as an eye glasses frame with sides 20 for supporting the device relative to ears of the user. Other forms of support arrangement may also be used, including but not limited to, head bands, visors or devices suspended from helmets.

Reference is made herein in the drawings and claims to an X axis which extends horizontally (FIG. 1A) or vertically (FIG. 1B), in the general extensional direction of the first region of the LOE, and a Y axis which extends perpendicular thereto, i.e., vertically in FIG. 1A and horizontally in FIG. 1B.

In very approximate terms, the first LOE, or first region 16 of LOE 12, may be considered to achieve aperture expansion in the X direction while the second LOE, or second region 18 of LOE 12, achieves aperture expansion in the Y direction. The details of the spread of angular directions in which different parts of the field of view propagate will be addressed more precisely below. It should be noted that the orientation as illustrated in FIG. 1A may be regarded as a "top-down" implementation, where the image illumination entering the main (second region) of the LOE enters from the top edge, whereas the orientation illustrated in FIG. 1B may be regarded as a "side-injection" implementation, where the axis referred to here as the Y axis is deployed horizontally. In the remaining drawings, the various features of certain embodiments of the present invention will be illustrated in the context of a "top-down" orientation, similar to FIG. 1A. However, it should be appreciated that all of those features are equally applicable to side-injection implementations, which also fall within the scope of the invention. In certain cases, other intermediate orientations are also applicable, and are included within the scope of the present invention except where explicitly excluded.

The POD employed with the devices of the present invention is preferably configured to generate a collimated image, i.e., in which the light of each image pixel is a parallel beam, collimated to infinity, with an angular direction corresponding to the pixel position. The image illumination thus spans a range of angles corresponding to an angular field of view in two dimensions.

Image projector 14 includes at least one light source, typically deployed to illuminate a spatial light modulator, such as an LCOS chip. The spatial light modulator modulates the projected intensity of each pixel of the image, thereby generating an image. Alternatively, the image projector may include a scanning arrangement, typically implemented using a fast-scanning mirror, which scans illumination from a laser light source across an image plane of the projector while the intensity of the beam is varied synchronously with the motion on a pixel-by-pixel basis, thereby projecting a desired intensity for each pixel. In both cases, collimating optics are provided to generate an output projected image which is collimated to infinity. Some or all of the above components are typically arranged on surfaces of one or more polarizing beam-splitter (PBS) cube or other prism arrangement, as is well known in the art.

Optical coupling of image projector 14 to LOE 12 may be achieved by any suitable optical coupling, such as for example via a coupling prism with an obliquely angled input surface, or via a reflective coupling arrangement, via a side edge and/or one of the major external surface of the LOE.

Details of the coupling-in configuration are not critical to the invention, and are shown here schematically as a non-limiting example of a wedge prism 15 applied to one of the major external surfaces of the LOE.

It will be appreciated that the near-eye display 10 includes various additional components, typically including a controller 22 for actuating the image projector 14, typically employing electrical power from a small onboard battery (not shown) or some other suitable power source. It will be appreciated that controller 22 includes all necessary electronic components such as at least one processor or processing circuitry to drive the image projector, all as is known in the art.

Turning now to FIGS. 2A-2F, the optical properties of an implementation of the near-eye display are illustrated in more detail. Specifically, there is shown a more detailed view of a light-guide optical element (LOE) 12 formed from transparent material, including a first region 16 containing a first set of planar, mutually-parallel, partially-reflecting surfaces 17 having a first orientation, and a second region 18 containing a second set of planar, mutually-parallel, partially-reflecting surfaces 19 having a second orientation non-parallel to the first orientation. A set of mutually-parallel major external surfaces 24 extend across the first and second regions 16 and 18 such that both the first set of partially-reflecting surfaces 17 and the second set of partially-reflecting surfaces 19 are located between the major external surfaces 24. Most preferably, the set of major external surfaces 24 are a pair of surfaces which are each continuous across the entirety of first and second regions 16 and 18, although the option of having a set down or a step up in thickness between the regions 16 and 18 also falls within the scope of the present invention. Regions 16 and 18 may be immediately juxtaposed so that they meet at a boundary, which may be a straight boundary or some other form of boundary, or there may be one or more additional LOE region interposed between those regions, to provide various additional optical or mechanical function, depending upon the particular application. Although the present invention is not limited to any particular manufacturing technique, in certain particularly preferred implementations, particularly high quality major external surfaces are achieved by employing continuous external plates between which the separately formed regions 16 and 18 are sandwiched to form the compound LOE structure.

The optical properties of the LOE may be understood by tracing the image illumination paths backwards. The second set of partially-reflecting surfaces 19 are at an oblique angle to the major external surfaces 24 so that a part of image illumination propagating within the LOE 12 by internal reflection at the major external surfaces from the first region 16 into the second region 18 is coupled out of the LOE towards an eye-motion box 26. The first set of partially-reflecting surfaces 17 are oriented so that a part of image illumination propagating within the LOE 12 by internal reflection at the major external surfaces from the coupling-in region (coupling prism 15) is deflected towards the second region 18.

One dimension of the angular spread of the projected image from image projector 14 is represented in FIG. 2A by the cone of illumination spreading from the POD aperture on the right side of the LOE towards the left side of the LOE. In the non-limiting example illustrated here, the central optical axis of the POD defines a direction of propagation within the LOE aligned with the X axis, and the angular spread (within the LOE) is roughly ±16°. (It should be noted that the angular FOV becomes larger in air due to the change in refractive index.) The first set of partially-reflecting surfaces 17 are illustrated in first region 16, and the second set of partially-reflecting surfaces 19 are illustrated in second region 18.

The near-eye display is designed to provide a full field-of-view of the projected image to an eye of the user that is located at some position within the permitted range of positions designated by an "eye-motion box" (EMB) 26 (that is, a shape, typically represented as a rectangle, spaced away from the plane of the LOE from which the pupil of the eye will view the projected image). In order to reach the eye-motion box, light must be coupled-out from the second region 18 by the second set of partially-reflecting surfaces 19 towards the EMB 26. In order to provide the full image field-of-view, each point in the EMB must receive the entire angular range of the image from the LOE. Tracing back the field-of-view from the EMB indicates a larger rectangle 28 from which relevant illumination is coupled-out of the LOE towards the EMB.

FIG. 2A illustrates a first extremity of the field of view, corresponding to the bottom-left pixel of the projected image. A beam of a width corresponding to the optical aperture of the projector as coupled into the LOE is shown propagating leftwards and upwards from the POD and being partially reflected from a series of partially-reflecting surfaces 17. As illustrated here, only a subset of the facets generate reflections that are useful for providing the corresponding pixel in the image viewed by the user, and only a sub-region of those facets contribute to the observed image of this pixel. The relevant regions are illustrated by heavy black lines, and the rays corresponding to this pixel in the redirected image reflected from facets 17 and then coupled-out by facets 19 reaching the four corners of the EMB 26 are shown. Here and throughout the description, it will be noted that only the in-plane propagation directions of the rays are illustrated here during propagation within the LOE, but the rays actually follow a zigzag path of repeated internal reflection from the two major external surfaces, and one entire dimension of the image field of view is encoded by the angle of inclination of the rays relative to the major external surfaces, corresponding to the pixel position in the Y dimension. By way of one additional example, deflected and coupled-out rays corresponding to the top-left extremity of the image as viewed at the top-left corner of the EMB are shown in dash-dot lines.

Figure 2B:
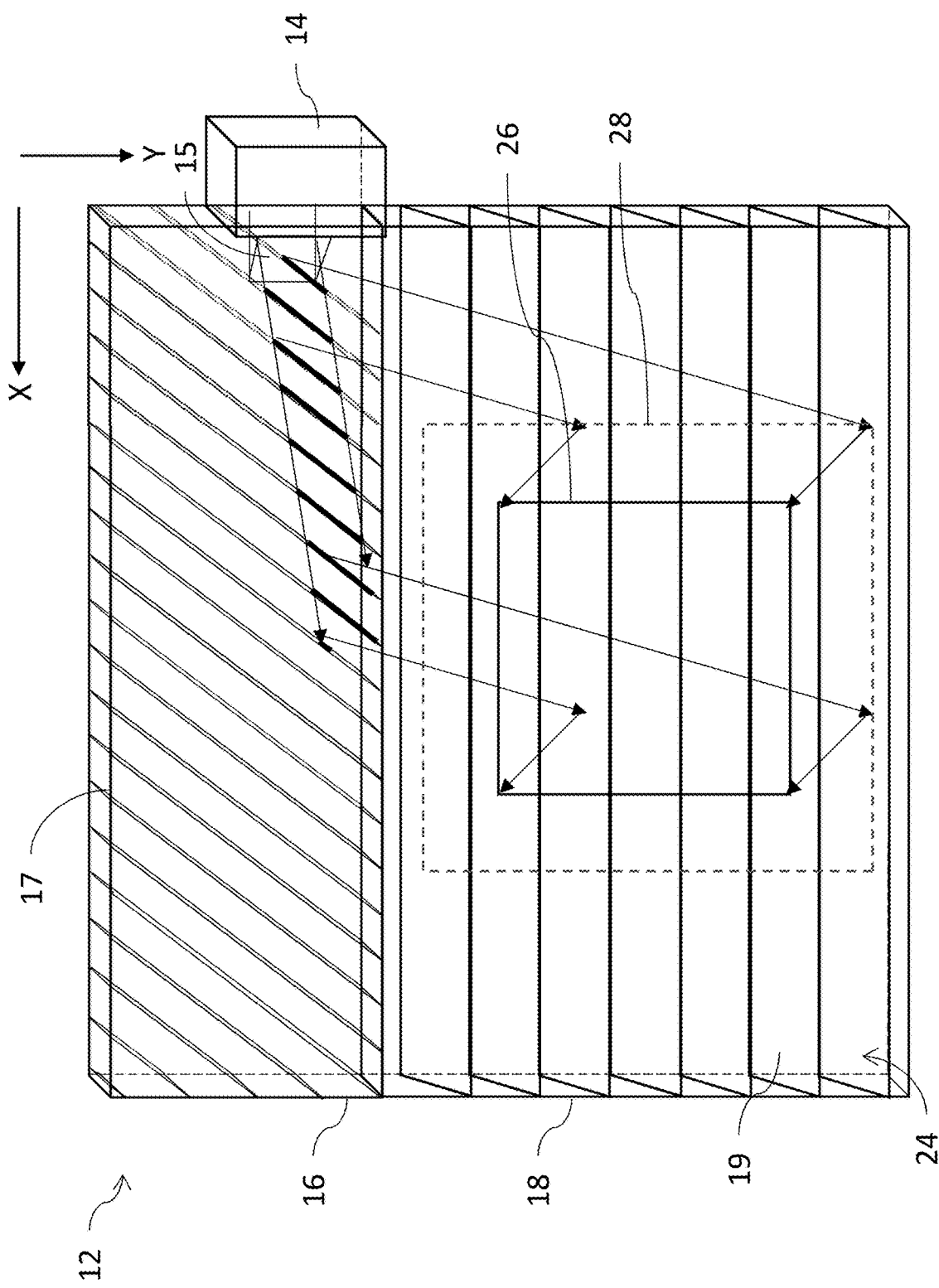
Figure 2C:
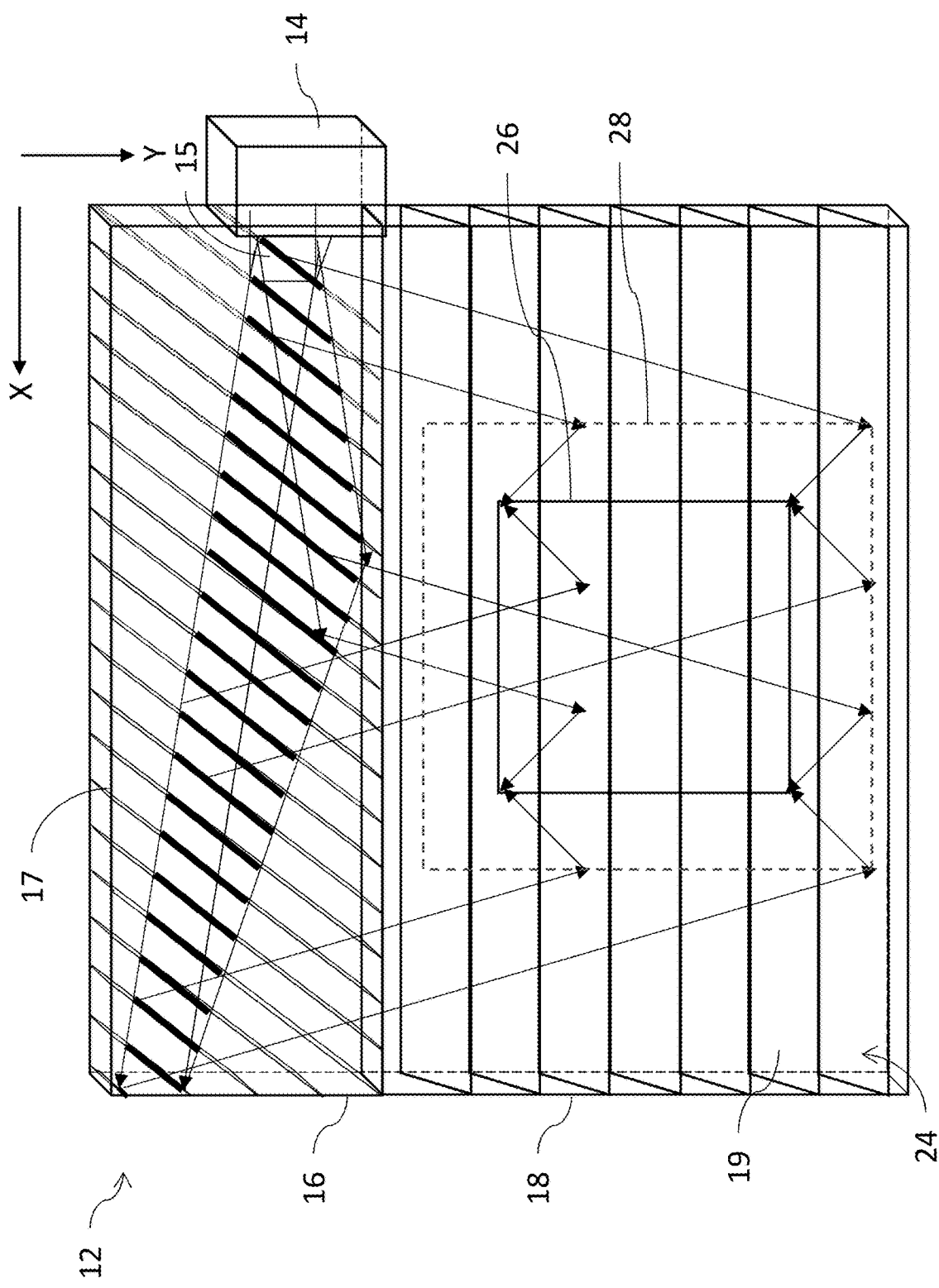
FIG. 2C is an overview of the combination of the fields of FIGS. 1A and 1B with additional fields to define an overall envelope of partially-reflecting surfaces that are needed to form a full image at an eye-motion box.

FIG. 2B illustrates the same configuration as FIG. 2A, but here shows the rays corresponding to the bottom-right pixel of the field-of-view reaching the four corners of the EMB, again with the relevant regions of the relevant partially-reflecting surfaces 17 denoted by a heavy line.

It will be apparent that, by additionally tracing correspond ray paths for all fields (directions or pixels) of the image reaching all regions of the EMB, it is possible to map out an envelope of all ray paths from the coupling-in region propagating within the LOE, deflected by one of the first set of partially-reflecting surfaces and coupled out by one of the second set of partially-reflecting surfaces in a direction reaching the eye-motion box, and this envelope defines an "imaging area" of each facet 17 which is needed for deflecting part of the image illumination which contributes to the image reaching the EMB, while the remainder of the facet 17 lying outside the envelope is a "non-imaging area" which does not contribute to the required image. A simplified outline of this envelope corresponding to the "imaging areas" of all of the facets 17 is shown in heavy lines in FIG. 2C.

According to one particularly preferred set of implementations of the present invention, facets 17 are implemented as "partial facets" such that the partially-reflecting properties are only present within a subregion of the cross-sectional area of region 16 which includes the "imaging area" of each facet plane, and preferably excludes at least the majority of the "non-imaging area" for some or all of the facets. Such an implementation is illustrated schematically in FIG. 2D. The active (partially-reflecting) area of the facets preferably extends slightly beyond the minimum required to complete the geometrical requirements for the EMB image projection in order to avoid anomalies that may be caused by imperfections at the edges of coatings, and the facets may also be further extended in some cases due to additional considerations relating to integer numbers of overlaps between facets in the deflected image direction to achieve improved image uniformity. According to certain particularly preferred implementations, the distance of the furthest partially-reflecting facet encountered along a line from the coupling-in location progressively increases with increasing angle clockwise as shown, away from the boundary with the second region 18 over a majority of the angular range of the image projected from projector 14.

Where first region 16 is formed from a stack of coated plates which are then cut at an appropriate angle (as described for example in PCT Patent Publication No. WO2007054928A1, and as known in the art), the selective spatial deployment of the partially-reflecting surfaces can advantageously be achieved be forming a stack of plates with a partially-reflecting coating located over a first part of the interface plane between two plates, while a second part of the interface plane is bonded (typically with index-matched adhesive and without coatings) so as to form an optical continuum between the two plates. Selective application of the partially-reflecting coatings is typically achieved by applying a suitable masking layer prior to the coating process, and removing the masking layer at the end of the coating process.

Figure 2D:
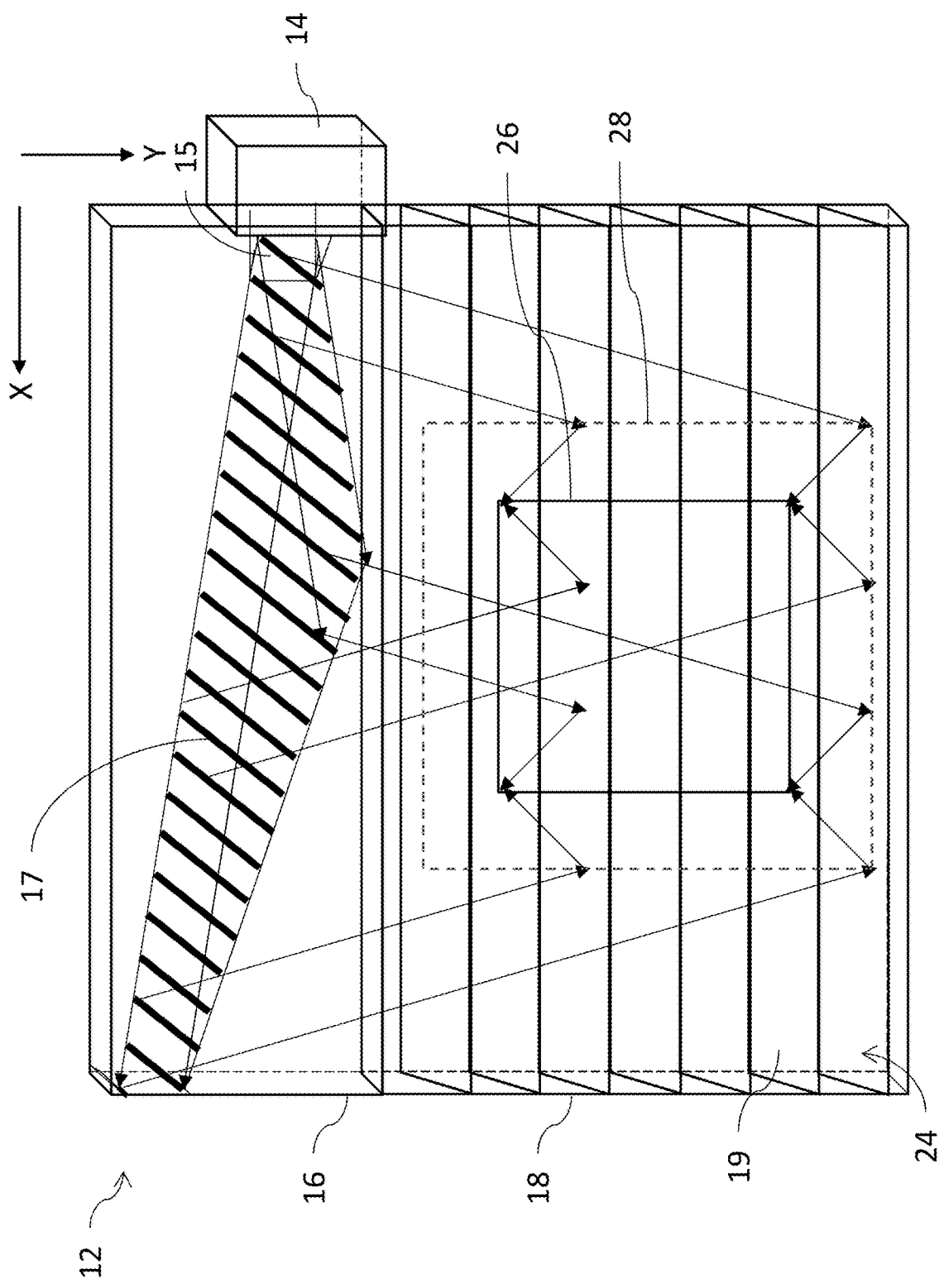
FIG. 2D is an alternative implementation of FIG. 2C in which the partially-reflecting surfaces are implemented selectively.

According to an alternative production technique, a stack of full area-coated plates may be formed and then cut to the shape required for the volume containing facets (e.g., corresponding to the regions with facets as shown in FIG. 2D). The required form of the LOE is then completed by optically bonding this irregular block containing the partially-reflecting facets together with complementary blocks of plain index-matched glass.

Figure 2E:
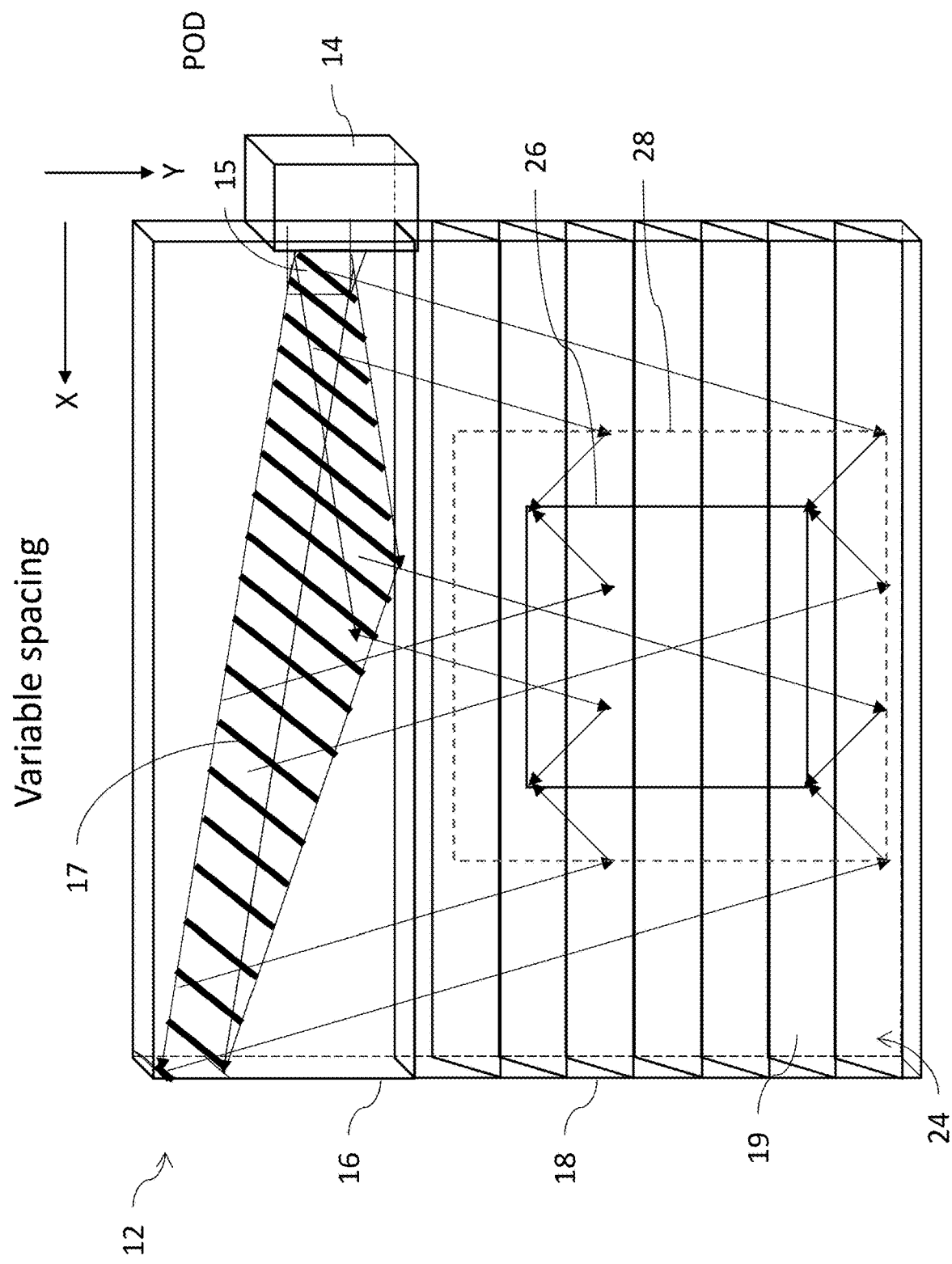
FIG. 2E is a view similar to FIG. 2D illustrating a variable spacing between the partially-reflecting surfaces.

FIG. 2E is similar to FIG. 2D, but illustrates an optical system in which the first set of partially-reflecting surfaces 17 have a non-uniform spacing between the planes of the surfaces such that a spacing between adjacent partially-reflecting surfaces proximal to the coupling-in region is smaller than a spacing between adjacent partially-reflecting surfaces further from the coupling-in region. This variable spacing is preferred in many cases to enhance uniformity of the projected image, as will be explained further below.

The optical axis is not actually parallel to the X axis but rather lies in the X-Z plane, with a Z-component into the page chosen such that the entire range of angles in the depth dimension of the FOV undergo total internal reflection at the major substrate surfaces. For simplicity of presentation, the graphic representations herein, and the description thereof, will relate only to the in-plane (X-Y) component of the light ray propagation directions, referred to herein as the "in-plane component" or the "component parallel to the major external surfaces of the LOE."

It will be noted that the uppermost ray direction of the field of view corresponds to the left side of the field of view reaching the observer's eye, while the lowest ray direction corresponds to the right side of the field of view. It will also be noted that some reflections of the left side of the field of view are reflected from facets near the right side of the LOE in a direction that will not reach the EMB, and will therefore be lost. Similarly, some rays from the right side of the field of view are reflected from facets near the left of the LOE and are deflected in a direction which will not reach the EMB, and will therefore be lost. Certain aspects of the present invention take advantage of these observations to reduce the dimensions (and hence volume and weight) of the first LOE (or LOE region).

Figure 2F:
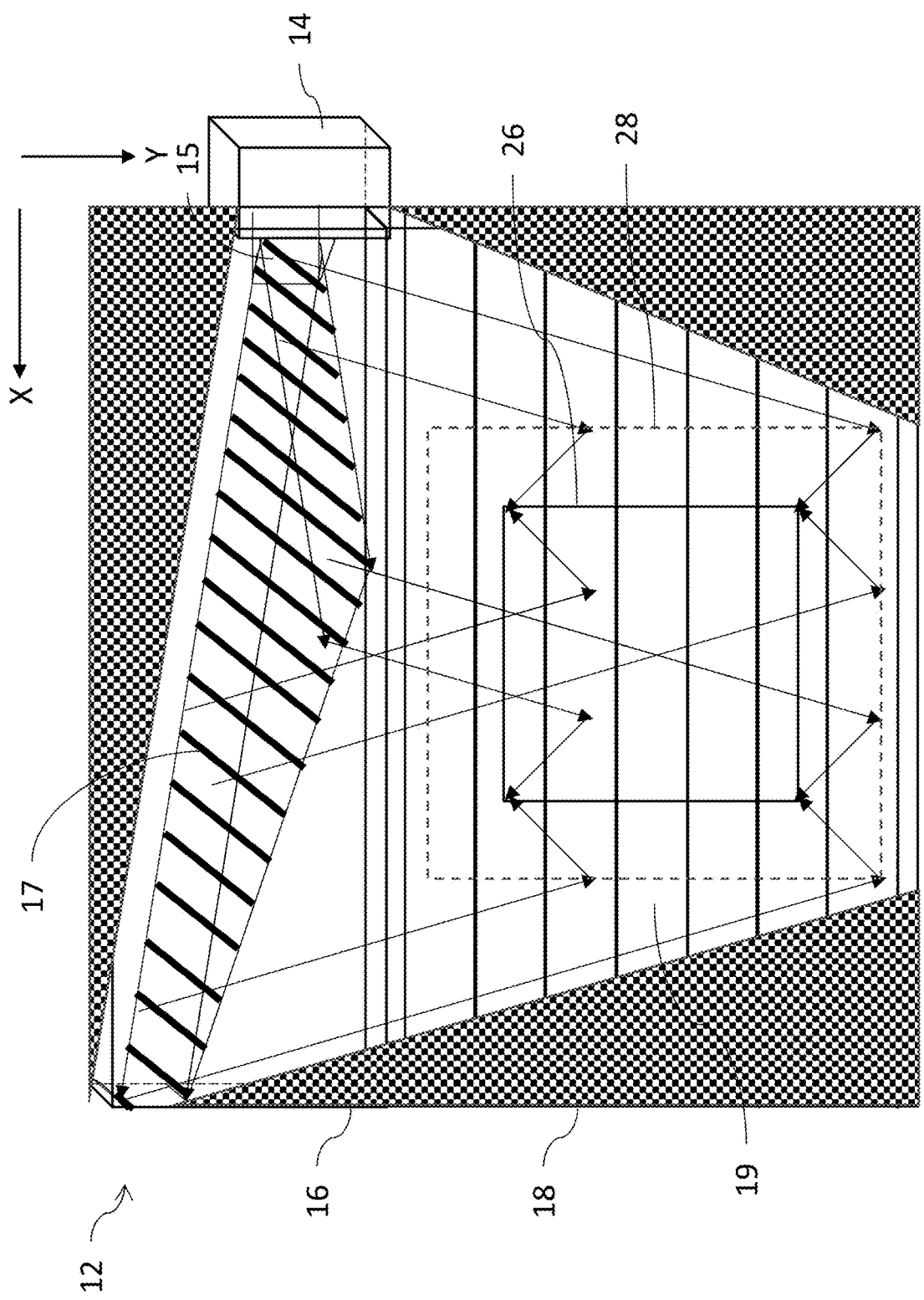
FIG. 2F is a view similar to FIG. 2E illustrating regions of the LOE which can be trimmed.

Specifically, FIG. 2F illustrates with shading various regions of FIG. 2E which do not contribute to the image reaching the EMB, and are therefore available to be truncated without interfering with image projection to the user's eye. It is also noted that the optical aperture for injection of the image from the image projector is in the lower half of the first region 16 of LOE 12, since the part of the image corresponding to the downward-angled rays as shown corresponds to the right side of the image field of view, which does not need to be reflected from facets nearer the left part of first region 16. This allows for a relatively compact implementation of the first region 16 of LOE 12. Specifically, the extent of the LOE below the POD optical axis is chosen such that the rays from the POD aperture corresponding to the right-most pixels of the field of view reach the facets from which they are deflected towards the entire area of the EMB, but the facets are shortened in regions where such angles can no longer reach the EMB. The reduction in height of first region 16 results also in a small reduction in the X dimension, since the reduction of the LOE height brings the facets closer to the EMB, and therefore reduces the required X dimension to cover the desired range of angles for the FOV. Here and elsewhere in this document, it will be noted that the terms "trimmed" and "truncated" are used to refer to geometries or dimensions of a final product that are reduced relative to the theoretical starting point of the implementation, for example, of FIG. 2A as a point of reference. This terminology does not carry any implementation of physically cutting away material or any other particular production technique. It is not necessarily envisaged that the LOE would be truncated exactly along the border of the indicated regions, but rather that these regions provide design flexibility, allowing the LOE to be finished with whatever arbitrary outer contour is considered esthetically preferred and/or mechanically compatible with additional details of a desired application.

It will be noted that the use of partial facets as described above with reference to FIGS. 2D-2F may provide one or more of a number of advantages, including improved efficiency and brightness where transmission of the image from the facets further from the coupling-in region does not need to pass through so many additional facets before reaching the second LOE region. An additional advantage is illustrated here with reference to FIGS. 3A and 3B.

Figure 3A:
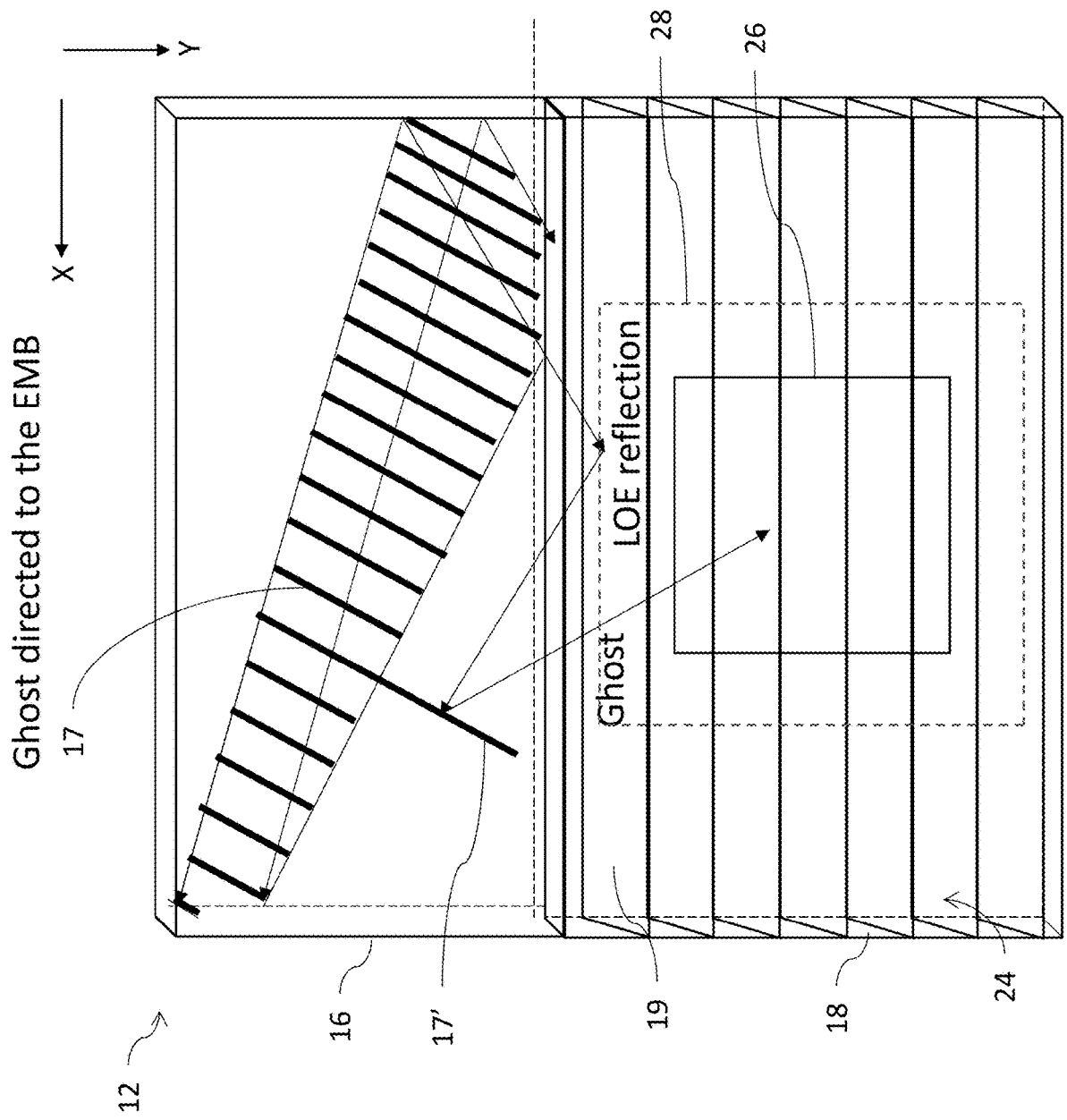

Specifically, FIG. 3A illustrates a region of a facet labeled 17', outside the envelope of facet regions required for transferring the projected image to the EMB. (This facet would normally be one among many, but has been illustrated here in isolation in order to more easily explain its significance.) FIG. 3A illustrates a ray path originating at the image projector for a downwards-directed image ray which passes directly through the partially-reflecting surfaces. This ray proceeds (propagating by total internal reflection) into second region 18 where it is incident on one of the second set of partially-reflecting surfaces 19 and is partially reflected as shown to generate an unwanted "ghost" reflection propagating back upwards into the first region 16. The angle of this ray is such that it may be reflected from the continuation of facet 17' in a direction towards the EMB 24, where it may form a visible ghost which interferes with the viewed image.

FIG. 3B illustrates by contrast what happens to the same ghost ray path in the event that the facets are only deployed in a reduced region at or near the regions required to form the output image. In this case, the ray reflected from the surface 19 and directed back up into the first region 16 does not encounter any partially-reflective surface as it propagates through the first region of the LOE. As a result, the ray continues until it reaches an outer edge of the LOE, where it is preferably absorbed or diffused by a suitable prepared non-reflective surface.

In the example of FIGS. 2A-2F, the dimension of the first LOE region 16 above the optical axis of the POD 14 cannot be reduced significantly, since the left-most region of the FOV must be reflected from facets at the left-most extreme of the LOE. FIGS. 4A-5B shows an alternative approach according to a further feature of certain particularly preferred implementations of the present invention which allows a further reduction in the dimensions of the first LOE region 16.

Specifically, in the arrangement of FIG. 4A, the POD and/or the coupling-in prism are rotated such that the central optical axis of the image projection is angled downwards across the first LOE region 16, with the angle most preferably chosen such that the left-most extremity of the FOV is projected roughly parallel to the X axis. In this case, the coupling-in of the POD is preferably at or near the upper extremity (typically in the top third) of the first LOE region 16. The required dimension of the LOE below the POD aperture is dictated by geometrical considerations similar to those described with reference to FIGS. 2A-2F, namely, that all rays of the image should encounter facets appropriately positioned and angled so as to deliver the corresponding region of the projected FOV to the entire EMB. The rightmost rays in this case descend at a steeper angle, and the facet angles are adjusted accordingly, but the overall Y dimension of the first LOE is still further reduced.

Figure 4B:
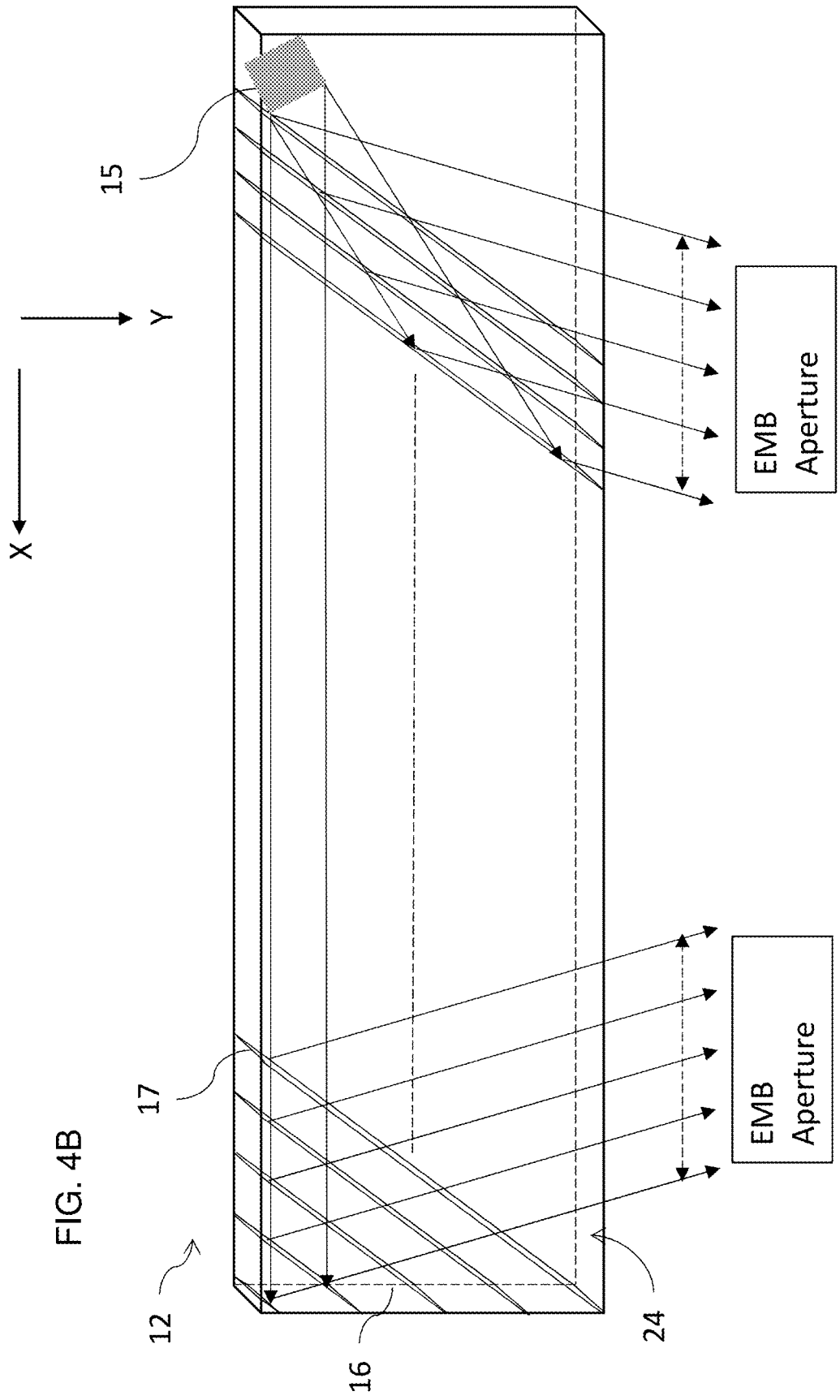
FIG. 4B is a view similar to FIG. 4A showing a partial representation of the partially-reflecting surfaces with variable spacing between the partially-reflecting surfaces.

In some cases, and as particularly emphasized by the steeper angles illustrated at the right side of the field of view in FIG. 4A, the geometrical requirements to "fill" the EMB require significantly different facet spacing between the right and left sides of the field of view. Thus, in the example illustrated in FIG. 4A, for a coupled-in optical aperture width as shown, the left-side field is effectively filled by one side of the pixel beam reflected from one facet coinciding with the other side of the beam reflected from the adjacent facet. On the right side of the field however, the uniform facet spacing as illustrated would result in "black lines" (illustrated here as thick black lines) within which no image illumination is present. If the facet spacing were uniformly decreased, this would lead to the converse problem of bright stripes near the left side of the field. To address this problem, a variable facet spacing is preferred, as illustrated by the partial set of facets shown in FIG. 4B with the corresponding geometrical constructs to show how the facet spacing is correctly adjusted to provide image illuminations "filling" the EMB for each extremity of the field of view. The facet spacing preferably varies progressively (although not necessarily continuously or linearly) across the LOE region 16.

Figure 4C:
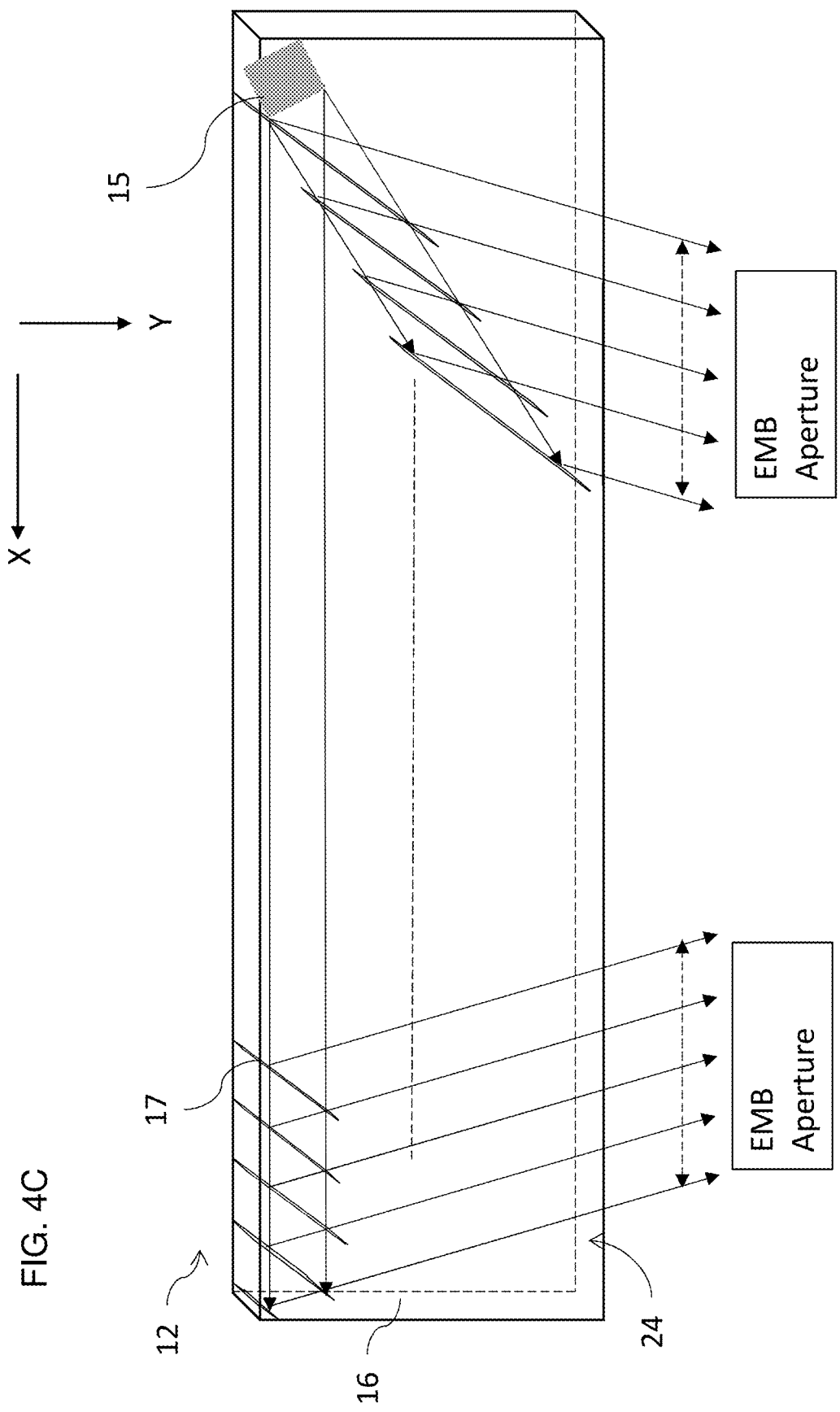
FIG. 4C is a view similar to FIG. 4B illustrating parts of the partially-reflecting surfaces required for the extremities of the field.
Figure 5A:
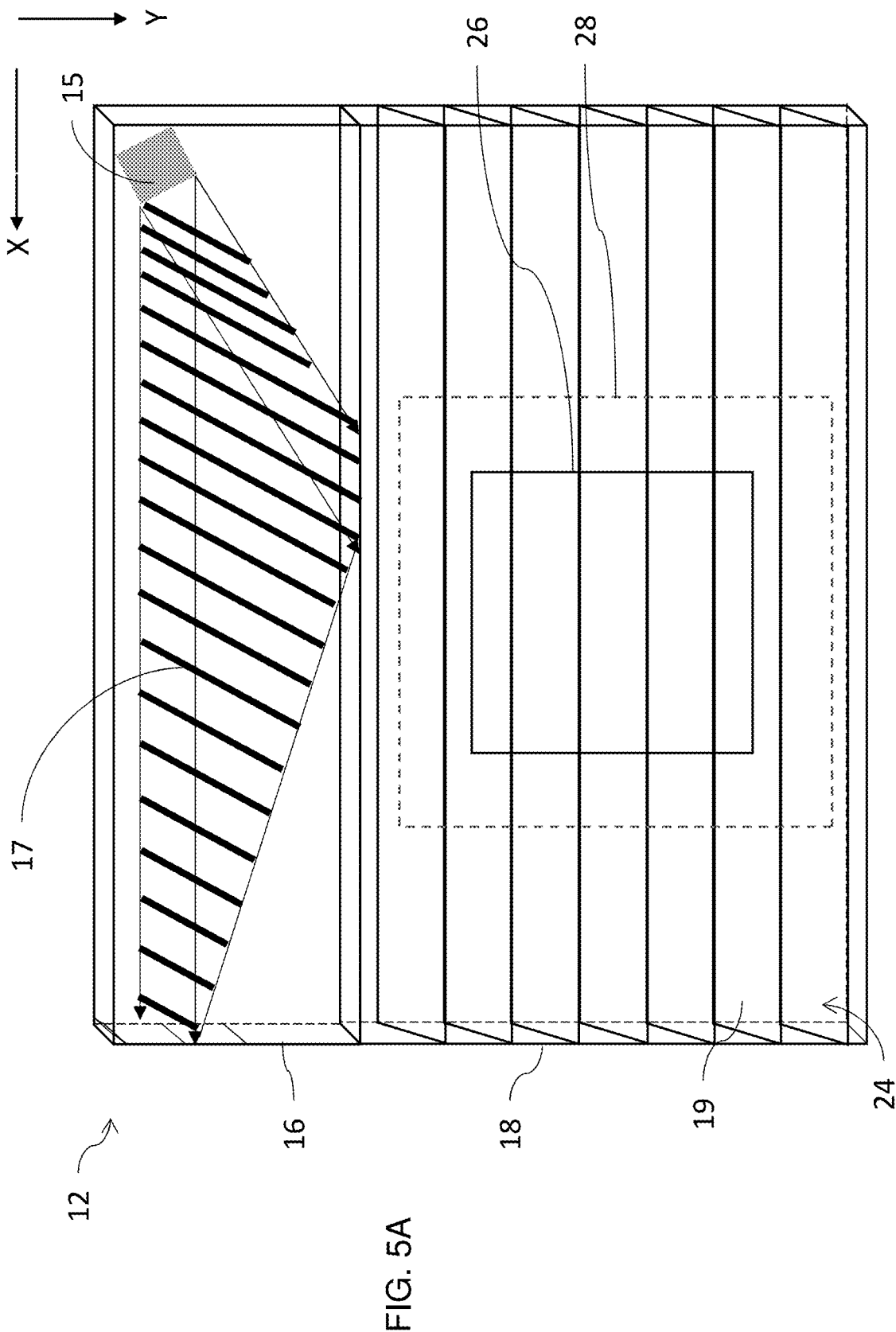
FIG. 5A is an enlarged schematic isometric view of an LOE including a first region similar to that of FIG. 4C implemented according to the principles illustrated above in relation to FIG. 2E.
Figure 5B:
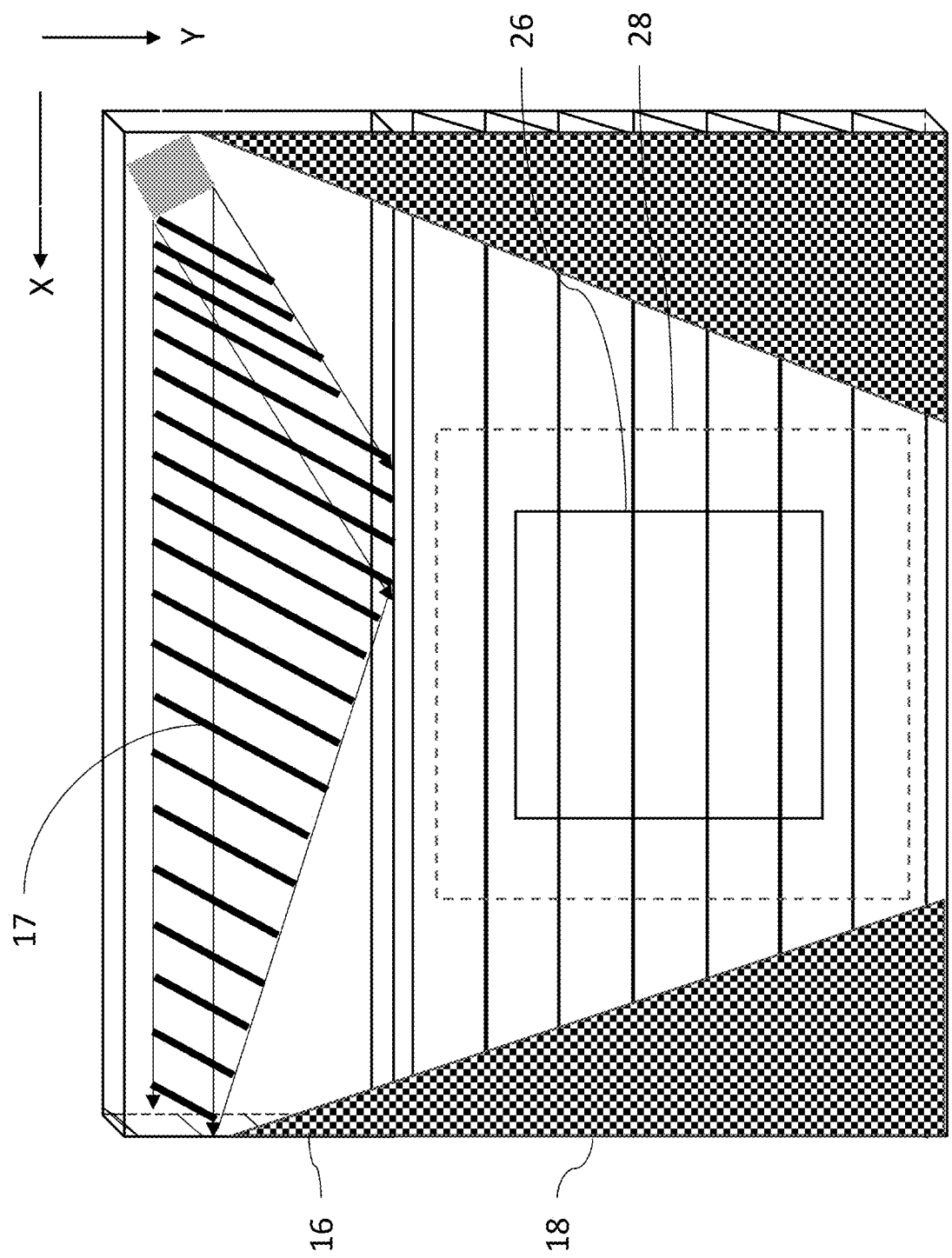
FIG. 5B is a view similar to FIG. 5A illustrating regions of the LOE which can be trimmed.

As described above with reference to FIGS. 2A-2E, it is possible to identify the regions of the various facets which are required to provide partial reflections in order to fill the EMB image for each field (pixel) of the image, as is illustrated for two extreme fields in FIG. 4C. Here too, by defining an "envelope" including all regions of all facets which are required to provide the output image at the eye-motion box 26, it is possible to implement first region 16 of the LOE 12 with selectively deployed partially-reflecting surfaces which vary in their extent across the first region, in a manner fully analogous in structure and function to that described above with reference to FIGS. 2D and 2E. A corresponding implementation of the overall optical system for this case is illustrated in FIG. 5A. FIG. 5B illustrates various additional regions of the first and second LOE's which do not contribute to the image transmission and can, according to the needs of each particular application, be trimmed away further as shown.

Thus, by deploying the image projector 14 with an in-plane component of the optical axis of the propagating image inclined relative to the X axis towards a boundary of the second region 18, and most preferably, ensuring that an in-plane component of one extremity of the field of view of the propagating image is substantially parallel to the X axis, it is possible to achieve further compactness of the overall configuration compared to that of FIGS. 2A-2F. In all other respects, the structure, function and range of options for implementing the device of FIGS. 4A-5B are as described above with reference to FIGS. 2A-3B.

In addition to the inclination of the optical axis direction of the image projector described in FIGS. 4A-5B, a number of other angular parameters may be used to achieve various adjustments to the properties of the optical system. Various examples of this will now be illustrated with reference to FIGS. 6A-6D and 7.

Figure 6A:
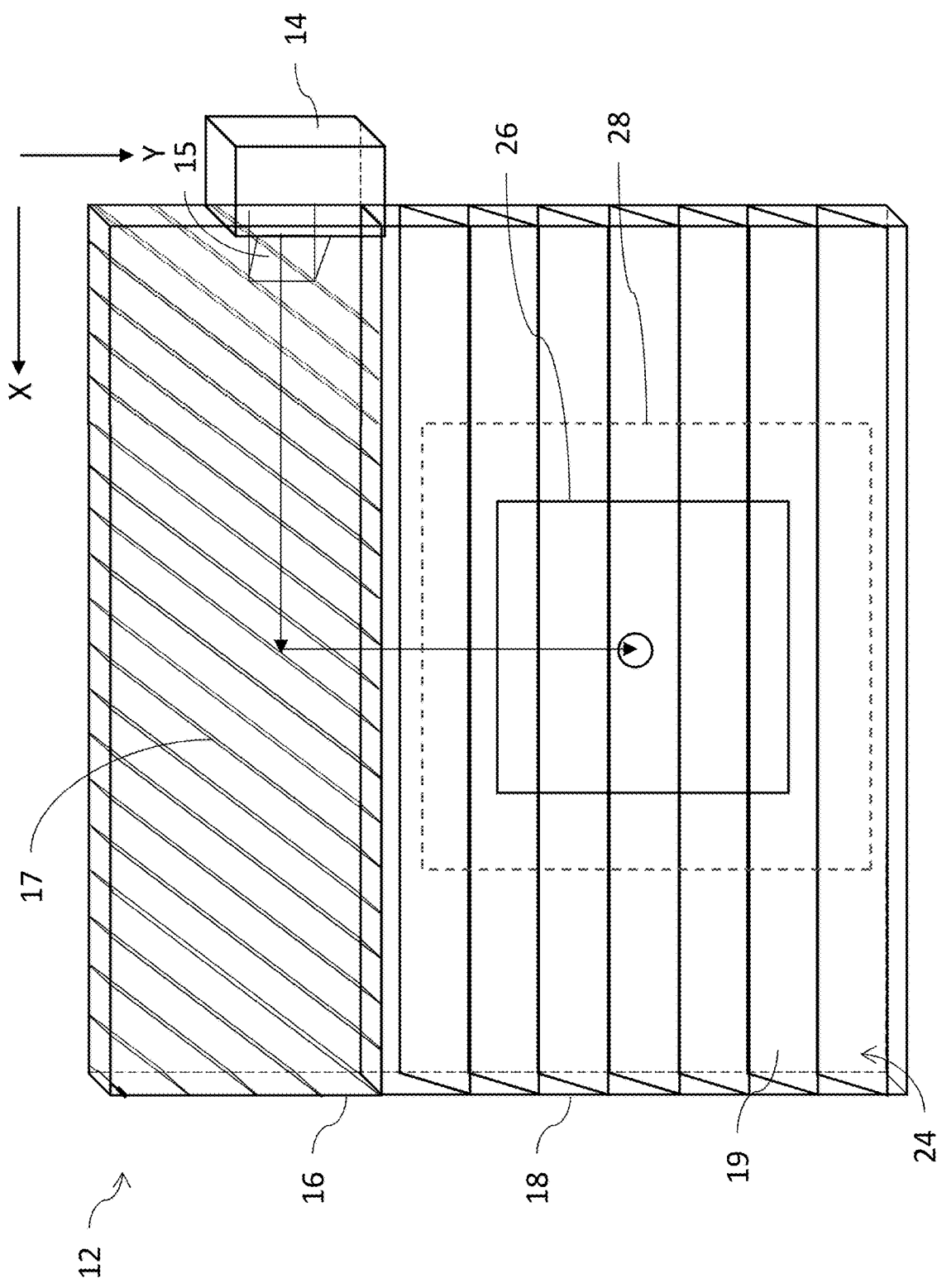
Figure 6B:
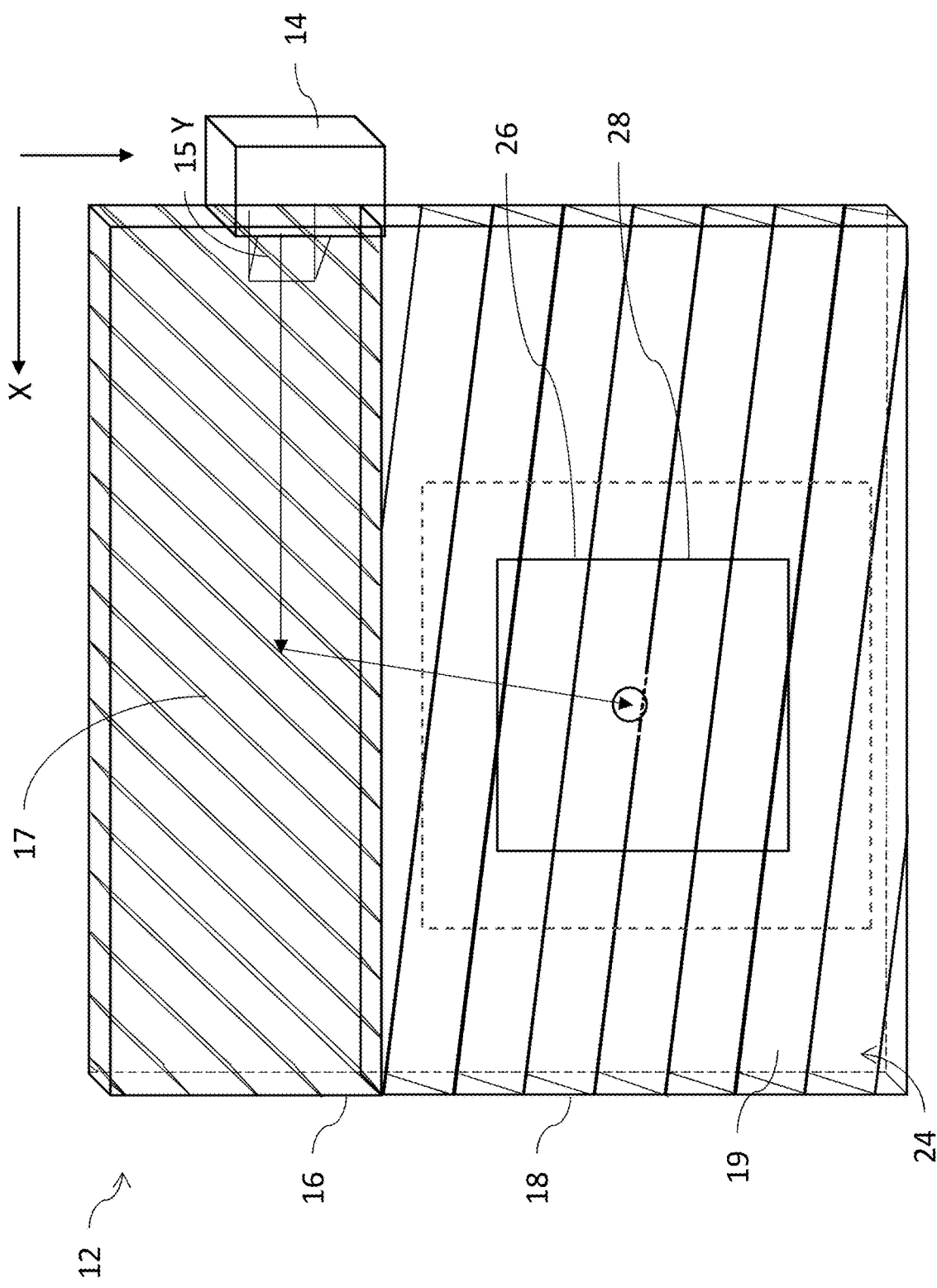

Referring first to FIGS. 6A and 6B, these illustrate a geometrical principle underlying adjustment of the eye-motion box location across the width dimension of the second region of the LOE 12. In FIG. 6A, an arrangement equivalent to FIGS. 2A-2F is shown, with a ray path corresponding to a central ray of the image as viewed from a center of the eye-motion box. This results in central positioning of the EMB.

FIG. 6B illustrates the effect of implementing the second region 18 of LOE 12 with facets 19 angularly offset relative to the X axis. In this case, the ray that forms the center of the field at the center of the eye-motion box is shifted, resulting in a horizontally displaced eye-motion box, useful where asymmetrical deployment of the EMB relative to the LOE is required. In this context, the "extensional direction" of a facet is taken to be a line of intersection of a facet with a plane parallel to the major external surfaces of the LOE. An equivalent definition is a line of intersection between a plane containing the partially-reflecting surface and the major external surface. This line is referred to herein as the extensional direction of the facet parallel to the major external surfaces, or the "in-plane" extensional direction. The extent of the "angular offset" relative to the X axis in this context depends on the extent of the horizontal shift required, but for certain preferred cases, may be in the range of 5-25 degrees, although both smaller and larger angular offsets are possible.

Figure 6D:
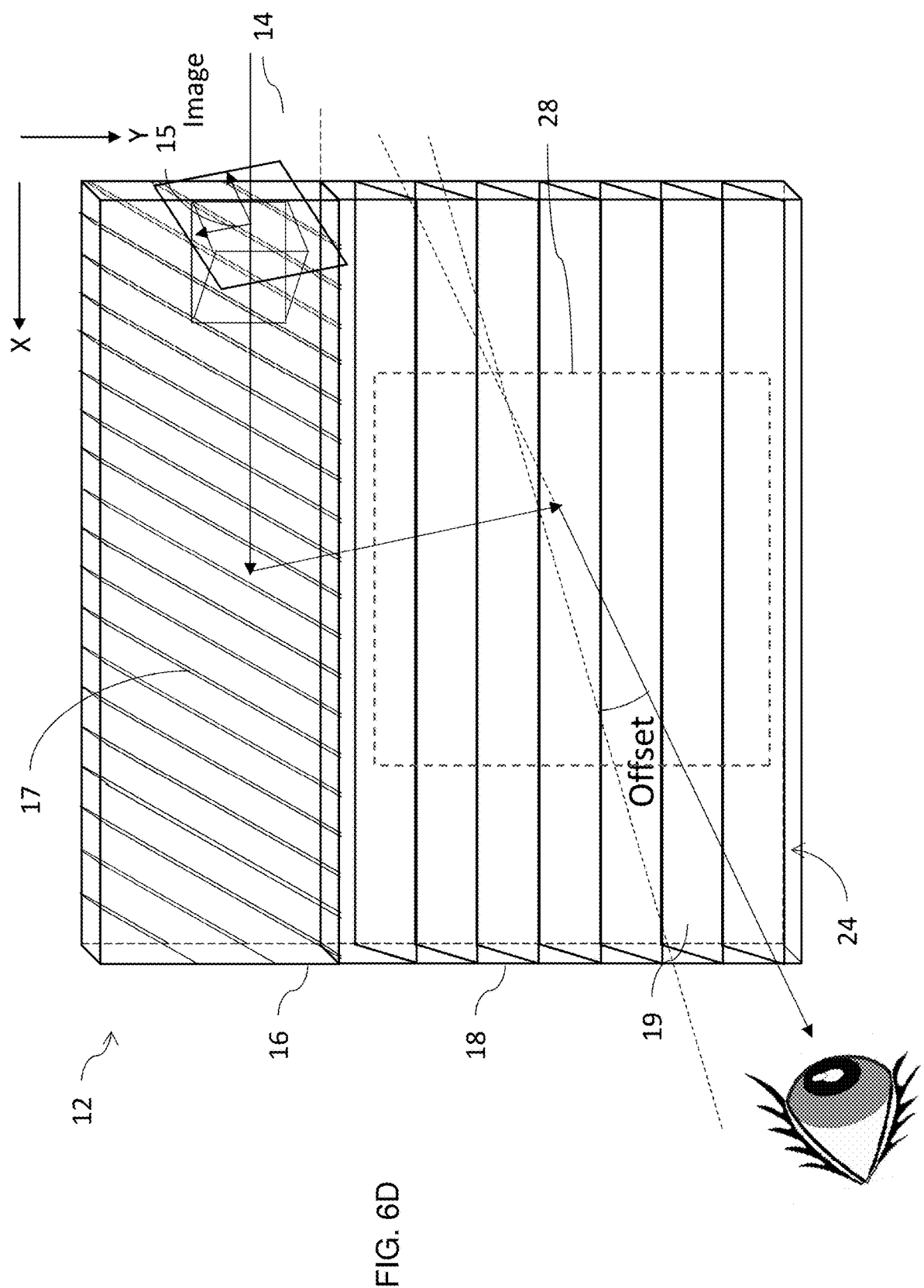

Turning to FIGS. 6C and 6D, this illustrates a further form of adjustment which allows correction for "face curvature" and/or convergence angle, as indicated in FIG. 7. Specifically, FIG. 7 shows schematically a top view of a near-eye display in which the LOEs are deployed with a tilt relative to each other, allowing them to be mounted in a "wrap-around" frame which is shaped to follow (to some extent) a side-to-side curvature of the face. In order to achieve stereo vision in such a configuration, it is necessary to correct for the face curvature so that the images are presented centered along parallel lines in space (dash-dot lines in FIG. 7), which are offset horizontally relative to the perpendicular to the LOE. Additionally, or alternatively, in various applications, particularly although not exclusively for indoor use, it is desirable to provide a convergence angle between the two displays so that objects viewed binocularly through the display appear to be localized at a desired direction from the user. This correction also requires a deflection from the normal to the LOE plane with a component in the horizontal (X axis) direction.

To achieve this correction, image projector 14 and the first set of partially-reflecting surfaces 17 are oriented so that the propagating image coupled in to the LOE from image projector 14 is deflected by facets 17 to generate a deflected propagating image propagating with an in-plane component of the optical axis inclined relative to the Y axis. A result of this offset, after coupling out by facets 19, is that the optical axis of the coupled-out image is deflected in a horizontal plane, i.e., is inclined relative to a normal to the major external surface with a non-zero component of inclination along an in-plane extensional direction of the second set of partially-reflecting surfaces, as illustrated in FIG. 6D.

Although these adjustments have been presented as independent adjustments, it should be noted that the various parameters of projector optical axis inclination, first LOE region facet angle and second LOE region facet angle are interrelated, and a variation of one of these parameters will typically require corresponding adjustments in the other parameters in order to ensure transmission of the entire field of view, and that these adjustments may result in a rotation of the injected image about its central axis, which may be corrected directly by rotation of the projector and/or coupling arrangement as illustrated schematically in FIG. 6D.

As mentioned above in the context of FIG. 1B, all of the above principles can also be applied to "sideway" configurations, where an image is injected from a POD located laterally outside the viewing area and is spread by a first set of facets vertically and then by a second set of facets horizontally for coupling into the eye of the user. All of the above-described configurations and variants should be understood to be applicable also in a side-injection configuration.

Throughout the above description, reference has been made to the X axis and the Y axis as shown, where the X axis is either horizontal or vertical, and corresponds to the first dimension of the optical aperture expansion, and the Y axis is the other major axis corresponding to the second dimension of expansion. In this context, X and Y can be defined relative to the orientation of the device when mounted on the head of a user, in an orientation which is typically defined by a support arrangement, such as the aforementioned glasses frame of FIGS. 1A and 1B. Other terms which typically coincide with that definition of the X axis include: (a) at least one straight line delimiting the eye-motion box, that can be used to define a direction parallel to the X axis; (b) the edges of a rectangular projected image are typically parallel to the X axis and the Y axis; and (c) a boundary between the first region 16 and the second region 18 typically extends parallel to the X axis.

It will be appreciated that the above descriptions are intended only to serve as examples, and that many other embodiments are possible within the scope of the present invention as defined in the appended claims.

What is claimed is:

1. An optical system for directing image illumination to an eye-motion box for viewing by an eye of a user, the optical system comprising:
    a light-guide optical element (LOE) formed from transparent material, said LOE comprising:
        (a) a first region containing a first set of planar, mutually-parallel, partially-reflecting surfaces having a first orientation;
        (b) a second region containing a second set of planar, mutually-parallel, partially-reflecting surfaces having a second orientation non-parallel to said first orientation; and
        (c) a set of mutually-parallel major external surfaces, said major external surfaces extending across said first and second regions such that both said first set of partially-reflecting surfaces and said second set of partially-reflecting surfaces are located between said major external surfaces, and
    an image projector for projecting a collimated image having an angular field of view about an optical axis, said image projector being optically coupled to said LOE so as to introduce the collimated image via a coupling-in region of said LOE as a propagating image propagating within said LOE by internal reflection at said major external surfaces,
wherein said second set of partially-reflecting surfaces are at an oblique angle to said major external surfaces so that a part of image illumination propagating within said LOE by internal reflection at said major external surfaces from said first region into said second region is coupled out of said LOE towards the eye-motion box, and wherein said first set of partially-reflecting surfaces are oriented so that a part of image illumination propagating within said LOE by internal reflection at said major external surfaces from said coupling-in region is deflected towards said second region, wherein each of said partially-reflecting surfaces of said first set of partially-reflecting surfaces comprises a partially-reflecting coating at an interface plane between two plates forming part of said LOE, and wherein said partially-reflecting coating is located over a first part of said interface plane, a length of said first part being defined by a line of intersection between a plane parallel to said major external surfaces and said first part of said interface plane, a field of view of a propagating image intersecting each of said interface planes at a region of intersection, a length of said region of intersection being defined by a line of intersection between a plane parallel to said major external surfaces and said region of intersection of said interface plane, and wherein, for a plurality of said partially-reflecting surfaces, said length of said first part of said interface plane is less than said length of said region of intersection, a second part of said interface plane within said region of intersection being bonded so as to form an optical continuum between said two plates.

2. The optical system of claim 1, wherein an envelope of ray paths from the coupling-in region propagating within said LOE, deflected by one of said first set of partially-reflecting surfaces and coupled out by one of said second set of partially-reflecting surfaces in a direction reaching the eye-motion box defines an imaging area of said one of said first set of partially-reflecting surfaces, and wherein an area of said one of said first set of partially-reflecting surfaces lying outside said envelope defines a non-imaging area of said one of said first set of partially-reflecting surfaces, wherein a majority of said non-imaging area is bonded so as to form an optical continuum between said two plates.

3. The optical system of claim 1, wherein said first set of partially-reflecting surfaces have a non-uniform spacing such that a spacing between adjacent partially-reflecting surfaces proximal to said coupling-in region is smaller than a spacing between adjacent partially-reflecting surfaces further from said coupling-in region.

4. The optical system of claim 1, wherein said propagating image is partially reflected by said first set of partially-reflecting surfaces to generate a deflected propagating image propagating within said LOE by internal reflection at said major external surfaces, said deflected propagating image being partially reflected by said second set of partially-reflecting surfaces to generate a coupled-out image directed outwards from one of said major external surfaces towards the eye-motion box, said optical axis of said coupled-out image being inclined relative to a normal to said major external surface with a non-zero component of inclination along an in-plane extensional direction of said second set of partially-reflecting surfaces.

5. The optical system of claim 1 configured for projecting the image to the eye-motion box with principal axes including an X axis corresponding to a first horizontal or vertical axis of the projected image, and a Y axis corresponding to the other axis of the projected image, and wherein said second set of partially-reflecting surfaces have an extensional direction parallel to said major external surfaces, said extensional direction having an angular offset relative to X axis.

6. The optical system of claim 1 configured for projecting the image to the eye-motion box with principal axes including an X axis corresponding to a first horizontal or vertical axis of the projected image, and a Y axis corresponding to the other axis of the projected image, an in-plane component of said optical axis of said propagating image being inclined relative to the X axis towards a boundary of said second region.

7. The optical system of claim 6, wherein an in-plane component of one extremity of said field of view of said propagating image is substantially parallel to the X axis.

8. The optical system of claim 1 configured for projecting the image to the eye-motion box with principal axes including an X axis corresponding to a first horizontal or vertical axis of the projected image, and a Y axis corresponding to the other axis of the projected image, said propagating image being partially reflected by said first set of partially-reflecting surfaces to generate a deflected propagating image propagating within said LOE by internal reflection at said major external surfaces, an in-plane component of said optical axis of said deflected propagating image being inclined relative to the Y axis.

* * * * *